United States Patent
Takagishi et al.

(10) Patent No.: US 8,164,854 B2
(45) Date of Patent: Apr. 24, 2012

(54) MAGNETIC RECORDING HEAD WITH SPIN OSCILLATION DEVICE AND MAGNETIC RECORDING APPARATUS INCLUDING THE MAGNETIC RECORDING HEAD

(75) Inventors: Masayuki Takagishi, Tokyo (JP); Kenichiro Yamada, Tokyo (JP); Hitoshi Iwasaki, Kanagawa-ken (JP); Junichi Akiyama, Kanagawa-ken (JP); Tomomi Funayama, Saitama-ken (JP); Masahiro Takashita, Kanagawa-ken (JP); Mariko Shimizu, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 977 days.

(21) Appl. No.: 12/155,473

(22) Filed: Jun. 4, 2008

(65) Prior Publication Data

US 2008/0304176 A1    Dec. 11, 2008

(30) Foreign Application Priority Data

Jun. 7, 2007 (JP) ................................ 2007-151390
Sep. 27, 2007 (JP) ................................ 2007-251193

(51) Int. Cl.
  *G11B 5/127* (2006.01)
(52) U.S. Cl. .................................. 360/125.31
(58) Field of Classification Search .......... 360/313–328, 360/65–67, 128, 125.3, 125.31, 125.71, 125.74
  See application file for complete search history.

(56) References Cited

U.S. PATENT DOCUMENTS

| | | |
|---|---|---|
| 4,103,315 A | 7/1978 | Hempstead et al. |
| 4,945,528 A | 7/1990 | Crasemann |
| 5,695,864 A | 12/1997 | Slonczewski |
| 5,748,399 A | 5/1998 | Gill |
| 5,768,066 A | 6/1998 | Akiyama et al. |
| 5,898,546 A | 4/1999 | Kanai et al. |
| 5,920,447 A | 7/1999 | Sakata et al. |
| 6,011,664 A | 1/2000 | Kryder et al. |
| 6,153,062 A | 11/2000 | Saito et al. |
| 6,278,576 B1 | 8/2001 | Ogata et al. |
| 6,519,119 B1 | 2/2003 | van der Heijden et al. |
| 6,580,589 B1 | 6/2003 | Gill |
| 6,583,969 B1 | 6/2003 | Pinarbasi |
| 6,621,664 B1 | 9/2003 | Trindade et al. |
| 6,697,231 B1 | 2/2004 | Kikuiri |
| 6,785,092 B2 | 8/2004 | Covington et al. |

(Continued)

FOREIGN PATENT DOCUMENTS

JP    64-070947    3/1989

(Continued)

OTHER PUBLICATIONS

X. Zhu and J.-G. Zhu, "Bias-Field-Free Microwave Oscillator Driven by Perpendicularly Polarized Spin Current," IEEE Trans. Magn. vol. 42, p. 2670 (2006).

(Continued)

*Primary Examiner* — Angel A. Castro
(74) *Attorney, Agent, or Firm* — Nixon & Vanderhye, P.C.

(57) ABSTRACT

A magnetic recording head includes a recording magnetic pole, and a spin oscillation device including a first magnetic layer having at least one magnetic material layer, a second magnetic layer having at least one magnetic material layer, and a first nonmagnetic layer provided between the first magnetic layer and the second magnetic layer. The first magnetic layer and the second magnetic layer are antiferromagnetically coupled and/or magnetostatically coupled to each other. The first magnetic layer and the second magnetic layer are laminated in a direction generally parallel to a medium facing surface and generally parallel to a side surface of the recording magnetic pole intersecting with the medium facing surface.

26 Claims, 28 Drawing Sheets

U.S. PATENT DOCUMENTS

| | | | |
|---|---|---|---|
| 6,809,900 B2 | 10/2004 | Covington | |
| 0,023,938 A1 | 2/2005 | SATO et al. | |
| 6,927,952 B2 | 8/2005 | Shimizu et al. | |
| 6,937,446 B2 | 8/2005 | Kamiguchi et al. | |
| 0,219,771 A1 | 10/2005 | SATO et al. | |
| 6,977,108 B2 | 12/2005 | Hieda et al. | |
| 6,982,845 B2 | 1/2006 | Kai et al. | |
| 7,106,555 B2 | 9/2006 | Kikuiri et al. | |
| 7,119,990 B2 | 10/2006 | Bajorek et al. | |
| 7,145,752 B2 | 12/2006 | Ueda et al. | |
| 7,154,707 B2 | 12/2006 | Watabe et al. | |
| 7,256,955 B2 | 8/2007 | Pokhil et al. | |
| 7,397,633 B2 | 7/2008 | Xue et al. | |
| 7,466,525 B2 | 12/2008 | Hasegawa et al. | |
| 7,471,491 B2 | 12/2008 | Sato et al. | |
| 7,473,478 B2 | 1/2009 | Sbiaa et al. | |
| 7,504,898 B2 | 3/2009 | Fukuzawa et al. | |
| 7,532,433 B2 | 5/2009 | Kawato et al. | |
| 7,532,434 B1 | 5/2009 | Schrek et al. | |
| 7,593,185 B2 | 9/2009 | Yazawa | |
| 7,616,412 B2 | 11/2009 | Zhu et al. | |
| 7,724,469 B2 | 5/2010 | Gao et al. | |
| 7,764,136 B2 | 7/2010 | Suzuki | |
| 7,791,829 B2 | 9/2010 | Takeo et al. | |
| 7,808,330 B2 | 10/2010 | Fukuzawa et al. | |
| 7,911,882 B2 | 3/2011 | Shimazawa et al. | |
| 7,957,098 B2 | 6/2011 | Yamada et al. | |
| 2001/0017752 A1 | 8/2001 | Hoshiya et al. | |
| 2002/0006013 A1 | 1/2002 | Sato et al. | |
| 2002/0051330 A1 | 5/2002 | Heijden et al. | |
| 2002/0075595 A1 | 6/2002 | Sato et al. | |
| 2002/0136927 A1 | 9/2002 | Hieda et al. | |
| 2003/0026040 A1 | 2/2003 | Covington et al. | |
| 2003/0090844 A1 | 5/2003 | Shimizu et al. | |
| 2004/0150912 A1 | 8/2004 | Kawato et al. | |
| 2004/0190197 A1 | 9/2004 | Watabe et al. | |
| 2004/0228045 A1 | 11/2004 | Hasegawa et al. | |
| 2005/0105213 A1 | 5/2005 | Takeo et al. | |
| 2005/0207050 A1 | 9/2005 | Pokhil | |
| 2005/0219771 A1 | 10/2005 | Sato et al. | |
| 2006/0171051 A1 | 8/2006 | Wachenschwanz et al. | |
| 2006/0198047 A1 | 9/2006 | Xue et al. | |
| 2006/0221507 A1 | 10/2006 | Sato et al. | |
| 2006/0222835 A1 | 10/2006 | Kudo et al. | |
| 2007/0109147 A1 | 5/2007 | Fukuzawa et al. | |
| 2008/0019040 A1 | 1/2008 | Zhu et al. | |
| 2008/0112087 A1 | 5/2008 | Clinton et al. | |
| 2008/0117545 A1 | 5/2008 | Batra et al. | |
| 2008/0129401 A1 | 6/2008 | Fukuzawa et al. | |
| 2008/0137224 A1 | 6/2008 | Gao et al. | |
| 2008/0150643 A1 | 6/2008 | Suzuki et al. | |
| 2008/0218891 A1 | 9/2008 | Gubbins et al. | |
| 2008/0268291 A1 | 10/2008 | Akiyama et al. | |
| 2008/0304176 A1 | 12/2008 | Takagishi et al. | |
| 2009/0052095 A1 | 2/2009 | Yamada et al. | |
| 2009/0059417 A1 | 3/2009 | Takeo et al. | |
| 2009/0059418 A1 | 3/2009 | Takeo et al. | |
| 2009/0059423 A1 | 3/2009 | Yamada et al. | |
| 2009/0080105 A1 | 3/2009 | Takashita et al. | |
| 2009/0080106 A1 | 3/2009 | Shimizu et al. | |
| 2009/0080120 A1 | 3/2009 | Funayama et al. | |
| 2009/0088095 A1 | 4/2009 | Kayano et al. | |
| 2009/0097167 A1 | 4/2009 | Sato et al. | |
| 2009/0097169 A1 | 4/2009 | Sato et al. | |
| 2009/0115541 A1 | 5/2009 | Persson et al. | |
| 2009/0225465 A1 | 9/2009 | Iwasaki et al. | |
| 2009/0257151 A1 | 10/2009 | Zhang et al. | |
| 2009/0262457 A1 | 10/2009 | Rivkin et al. | |
| 2010/0007992 A1 | 1/2010 | Yamada et al. | |
| 2010/0134922 A1 | 6/2010 | Yamada et al. | |

FOREIGN PATENT DOCUMENTS

| | | |
|---|---|---|
| JP | 05-20635 | 1/1993 |
| JP | 07-244801 | 9/1995 |
| JP | 2002-100005 | 4/2002 |
| JP | 2002-208744 | 7/2002 |
| JP | 2002-279616 | 9/2002 |
| JP | 2004-295987 | 10/2004 |
| JP | 2005-108315 | 4/2005 |
| JP | 2005-525663 | 8/2005 |
| JP | 2005-285242 | 10/2005 |
| JP | 2006-209960 | 8/2006 |
| JP | 2006-209964 | 8/2006 |
| JP | 2006-286855 | 10/2006 |
| JP | 3833512 | 10/2006 |
| JP | 2007-012264 | 1/2007 |
| JP | 2007-124340 | 5/2007 |
| JP | 2007-184923 | 7/2007 |
| JP | 2007-193906 | 8/2007 |
| JP | 2008-123669 | 5/2008 |
| KR | 1020030039289 | 5/2003 |
| WO | 2006-101040 | 9/2006 |

OTHER PUBLICATIONS

Zhu et al., "Microwave Assisted Magnetic Recording (MAMR)", Digest of the 18$^{th}$ Magnetic Recording Conference, pp. 34-35, 2007.
Takeo et al., U.S. Appl. No. 12/196,628, filed Aug. 22, 2008.
Iwasaki et al., U.S. Appl. No. 12/232,014, filed Sep. 9, 2008.
Takashita et al., U.S. Appl. No. 12/232,391, filed Sep. 16, 2008.
Funayama et al., U.S. Appl. No. 12/232,392, filed Sep. 16, 2008.
Shimizu et al., U.S. Appl. No. 12/232,469, filed Sep. 17, 2008.
Yamada et al., U.S. Appl. No. 12/155,329, filed Jun. 2, 2008.
Yamada et al., U.S. Appl. No. 12/780,269, filed May 13, 2010.
Korean Office Action issued in KR Application No. 10-2008-52086 on Aug. 24, 2009 (English translation attached).
U.S. Appl. No. 12/153,490, Kenichiro Yamada et al., filed May 20, 2008 (JP2007-229121).
Office Action dated May 6, 2011 in JP 2009-067297 and English-language translation thereof.
Akiyama et al., U.S. Appl. No. 12/109,760, filed Apr. 25, 2008.
Takeo et al., U.S. Appl. No. 12/196,841, filed Aug. 22, 2008.
Office Action dated Oct. 28, 2011 in JP Application No. 2007-151390 and English-language translation thereof.

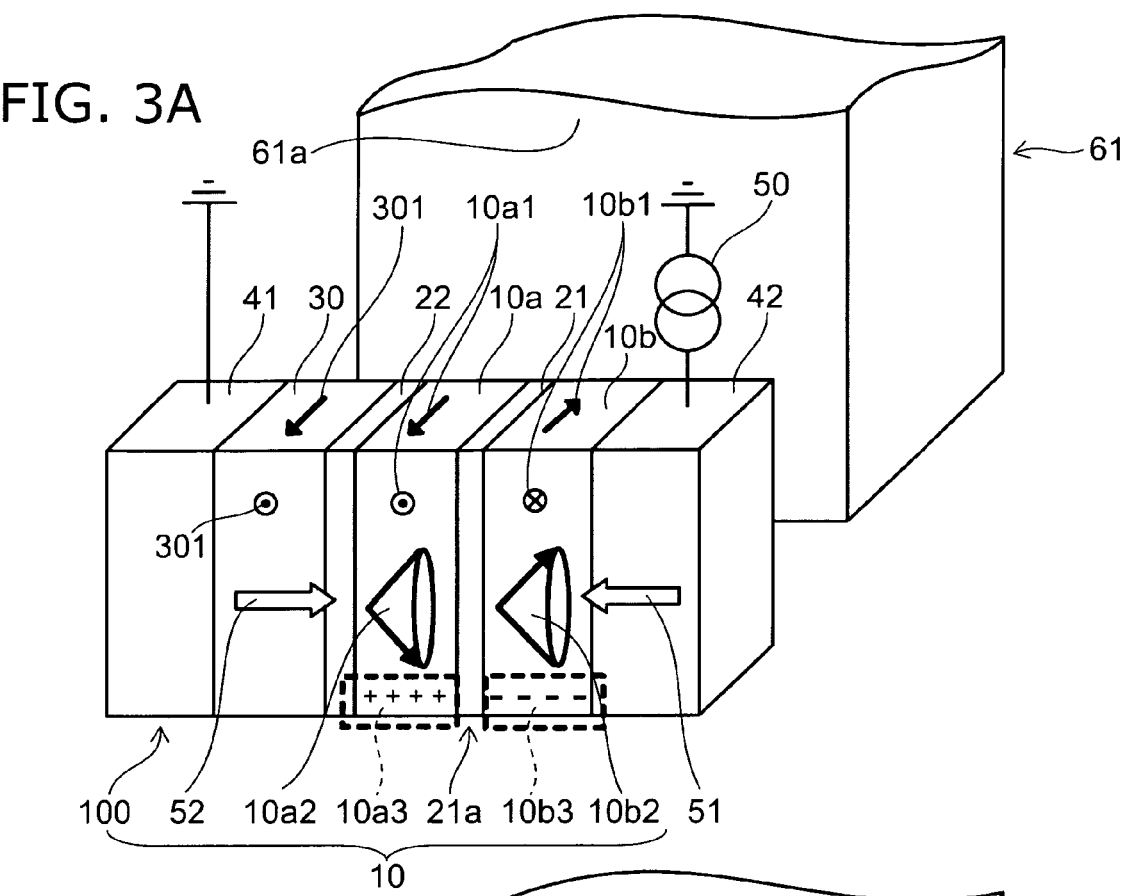
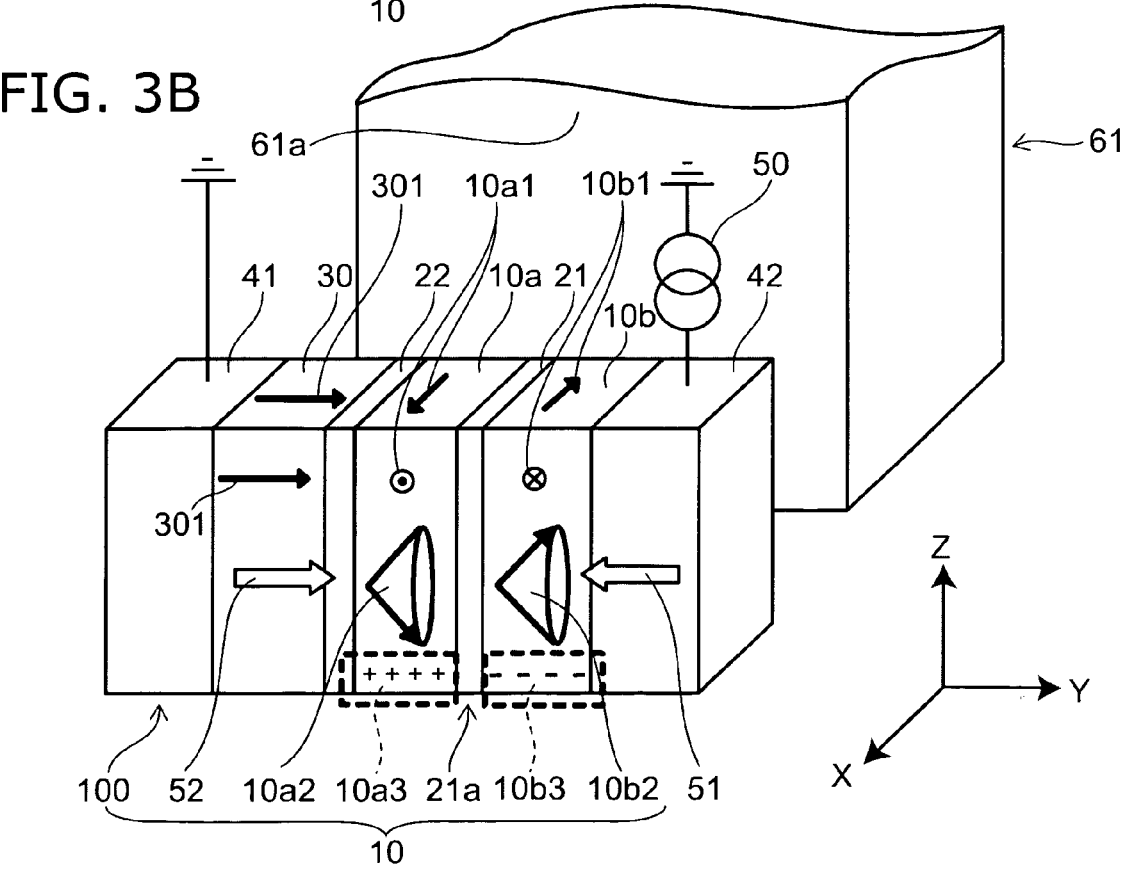

|  |  | DISK ROTATION SPEED | | |
|---|---|---|---|---|
|  |  | 5400rpm | 7200rpm | 10000rpm |
| DISK DIAMETER | 3.5inch | 25.1 | 33.5 | 46.5 |
|  | 2.5inch | 18.0 | 23.9 | 33.2 |

DISK MAXIMUM TRAVEL VELOCITY OF HARD DISK DRIVE (IN m/sec)

FIG. 17A

|  |  | DISK ROTATION SPEED | | |
|---|---|---|---|---|
|  |  | 5400rpm | 7200rpm | 10000rpm |
| DISK DIAMETER | 3.5inch | 17.6 | 23.5 | 32.6 |
|  | 2.5inch | 12.6 | 16.8 | 23.3 |

LENGTH OF OSCILLATION LAYER REQUIRED IN DISK TRAVEL DIRECTION (IN nm)

FIG. 17B

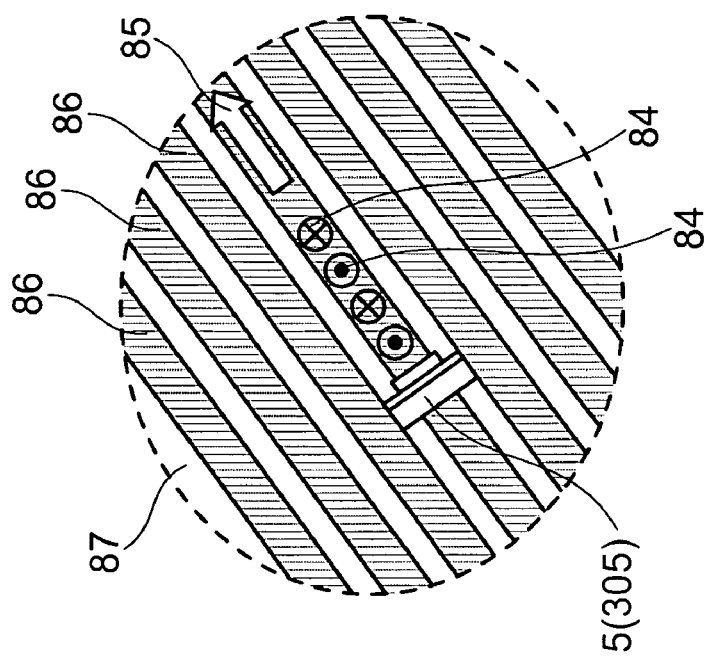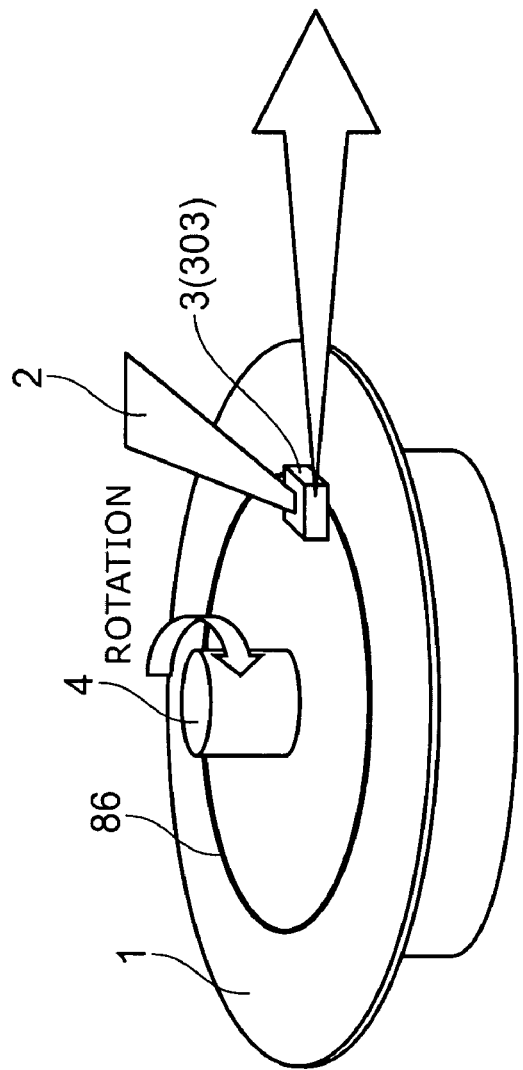
FIG. 27

MAGNETIC RECORDING HEAD WITH SPIN OSCILLATION DEVICE AND MAGNETIC RECORDING APPARATUS INCLUDING THE MAGNETIC RECORDING HEAD

CROSS-REFERENCE TO RELATED APPLICATIONS

This application is based upon and claims the benefit of priorities from the prior Japanese Patent Application No. 2007-151390, filed on Jun. 7, 2007, and the prior Japanese Patent Application No. 2007-251193, filed on Sep. 27, 2007; the entire contents of which are incorporated herein by reference.

BACKGROUND OF THE INVENTION

1. Field of the Invention

This invention relates to a magnetic recording head and a magnetic recording apparatus suitable for realizing data storage with high recording density, high recording capacity, and high data transfer rate.

2. Background Art

In the 1990s, the practical application of MR (magnetoresistive effect) heads and GMR (giant magnetoresistive effect) heads triggered a dramatic increase in the recording density and recording capacity of HDD (hard disk drive). However, in the early 2000s, the problem of thermal fluctuations in magnetic recording media became manifest, and hence the increase of recording density temporarily slowed down. Nevertheless, perpendicular magnetic recording, which is in principle more advantageous to high-density recording than longitudinal magnetic recording, was put into practical use in 2005. It serves as an engine for the increase of HDD recording density, which exhibits an annual growth rate of approximately 40% these days.

Furthermore, the latest demonstration experiments have achieved a recording density exceeding 400 Gbits/inch$^2$. If the development continues steadily, the recording density is expected to realize 1 Tbits/inch$^2$ around 2012. However, it is considered that such a high recording density is not easy to realize even by using perpendicular magnetic recording because the problem of thermal fluctuations becomes manifest again.

As a recording technique possibly solving the above problem, "radio-frequency magnetic field assisted recording" is proposed. In radio-frequency magnetic field assisted recording, a radio-frequency magnetic field near the resonance frequency of the magnetic recording medium, which is sufficiently higher than the recording signal frequency, is locally applied. This produces resonance in the magnetic recording medium, which decreases the coercivity (Hc) of the magnetic recording medium subjected to the radio-frequency magnetic field to less than half the original coercivity. Thus, superposition of a radio-frequency magnetic field on the recording magnetic field enables magnetic recording onto a magnetic recording medium having higher coercivity (Hc) and higher magnetic anisotropy energy (Ku) (e.g., U.S. Pat. No. 6,011,664). However, the technique disclosed in U.S. Pat. No. 6,011,664 uses a coil to generate a radio-frequency magnetic field, and it is difficult to efficiently apply a radio-frequency magnetic field in high-density recording.

Techniques based on a spin torque oscillator are also proposed as a means for generating a radio-frequency magnetic field (e.g., US Patent Application Publication No. 2005/0023938 and US Patent Application Publication No. 2005/0219771). In the techniques disclosed in US Patent Application Publication No. 2005/0023938 and US Patent Application Publication No. 2005/0219771, the spin torque oscillator comprises a spin injection layer, an intermediate layer, a magnetic layer (oscillation layer), and electrodes. When a DC current is passed through the spin torque oscillator via the electrodes, the spin torque generated by the spin injection layer produces ferromagnetic resonance in the magnetization of the magnetic layer (oscillation layer). Consequently, a radio-frequency magnetic field is generated from the spin torque oscillator.

Because the spin torque oscillator has a size of approximately several ten nanometers, the generated radio-frequency magnetic field is localized within approximately several ten nanometers around the spin torque oscillator. Furthermore, the perpendicularly magnetized magnetic recording medium can be efficiently resonated by the longitudinal (in-plane) component of the radio-frequency magnetic field, allowing a significant decrease in the coercivity of the magnetic recording medium. Consequently, high-density magnetic recording is performed only in a portion where the recording magnetic field of the main magnetic pole overlaps the radio-frequency magnetic field of the spin torque oscillator, allowing use of magnetic recording media having high coercivity (Hc) and high magnetic anisotropy energy (Ku). Thus the problem of thermal fluctuations in high-density recording can be avoided.

On the other hand, there is also a technique for using an oblique recording magnetic field to perform recording on a magnetic recording medium having high coercivity (Hc). According to the Stoner-Wohlfarth model, a magnetic recording medium having high coercivity (Hc) can be reversed in magnetization under a 45°-oriented magnetic field. In perpendicular magnetic recording, an oblique recording magnetic field can be generated from a surface of the recording magnetic pole intersecting with the recording medium facing surface. Furthermore, to generate an oblique magnetic field having steep variation in magnetic field strength, it is effective to add an auxiliary magnetic pole near the recording magnetic pole. By adjusting the gap between the surface of the recording magnetic pole intersecting with the recording medium facing surface and the surface of the auxiliary magnetic pole intersecting with the recording medium facing surface, the magnetic field produced in the recording medium can be inclined to steepen the strength variation. Hence a magnetic recording head having a recording magnetic pole and an auxiliary magnetic pole enables high-density recording, allowing use of a magnetic recording medium having higher coercivity (Hc) and higher magnetic anisotropy energy (Ku).

SUMMARY OF THE INVENTION

According to an aspect of the invention, there is provided a magnetic recording head including: a recording magnetic pole; and a spin oscillation device including a first magnetic layer having at least one magnetic material layer, a second magnetic layer having at least one magnetic material layer, and a first nonmagnetic layer provided between the first magnetic layer and the second magnetic layer, the first magnetic layer and the second magnetic layer being antiferromagnetically coupled and/or magnetostatically coupled to each other, and the first magnetic layer and the second magnetic layer being laminated in a direction generally parallel to a medium facing surface and generally parallel to a side surface of the recording magnetic pole intersecting with the medium facing surface.

According to another aspect of the invention, there is provided a magnetic recording head including: a main magnetic pole; a laminated body in which a first magnetic layer, a second magnetic layer, and an intermediate layer provided between the first magnetic layer and the second magnetic layer are laminated generally perpendicular to a medium travel direction; and a pair of electrodes operable to pass a current through the laminated body.

According to another aspect of the invention, there is provided a magnetic recording apparatus including: a magnetic recording medium; the magnetic recording head including: a recording magnetic pole; and a spin oscillation device including a first magnetic layer having at least one magnetic material layer, a second magnetic layer having at least one magnetic material layer, and a first nonmagnetic layer provided between the first magnetic layer and the second magnetic layer, the first magnetic layer and the second magnetic layer being antiferromagnetically coupled and/or magnetostatically coupled to each other, and the first magnetic layer and the second magnetic layer being laminated in a direction generally parallel to a medium facing surface and generally parallel to a side surface of the recording magnetic pole intersecting with the medium facing surface; a moving unit configured to allow relative movement between the magnetic recording medium and the magnetic recording head, which are opposed to each other with a spacing therebetween or in contact with each other; a controller configured to position the magnetic recording head at a prescribed recording position of the magnetic recording medium; and a signal processor configured to perform writing and reading of a signal on the magnetic recording medium by using the magnetic recording head, the oscillation frequency of the spin oscillation device being generally equal to the ferromagnetic resonance frequency of a recording magnetic grain or a recording magnetic dot constituting a recording magnetic layer of the magnetic recording medium.

According to another aspect of the invention, there is provided a magnetic recording apparatus including: a magnetic recording medium; the magnetic recording head including: a main magnetic pole; a laminated body in which a first magnetic layer, a second magnetic layer, and an intermediate layer provided between the first magnetic layer and the second magnetic layer are laminated generally perpendicular to a medium travel direction; and a pair of electrodes operable to pass a current through the laminated body; a moving unit configured to allow relative movement between the magnetic recording medium and the magnetic recording head, which are opposed to each other with a spacing therebetween or in contact with each other; a controller configured to position the magnetic recording head at a prescribed recording position of the magnetic recording medium; and a signal processor configured to perform writing and reading of a signal on the magnetic recording medium by using the magnetic recording head.

BRIEF DESCRIPTION OF THE DRAWINGS

FIGS. 3A and 3B are schematic views illustrating the configuration of a spin oscillation device;

FIGS. 17A and 17B show tables listing the disk maximum travel velocity and the length required for the oscillation layer in typical specifications;

FIG. 27 is a schematic view illustrating a magnetic recording medium that can be used in this embodiment.

DETAILED DESCRIPTION OF THE INVENTION

Figure 1:
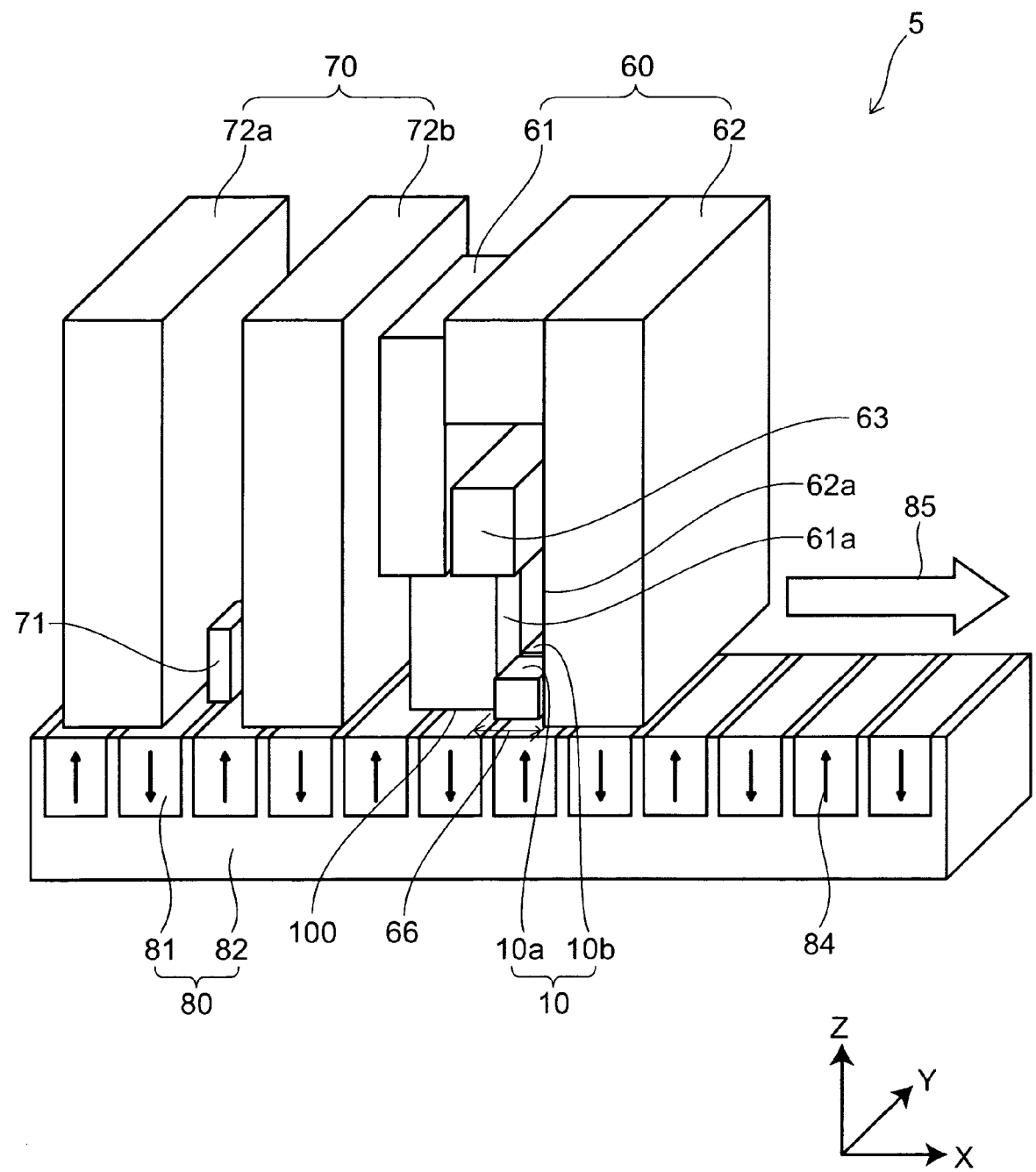
FIG. 1 is a perspective view showing the schematic configuration of a magnetic recording head according to the embodiment of the invention.

Embodiments of the invention will now be described with reference to the drawings, where like elements are labeled with like reference numerals, and the detailed description thereof is omitted as appropriate.

A first embodiment of a magnetic recording head of the invention is described in the case of recording on a multiparticle medium for perpendicular magnetic recording.

FIG. 1 is a perspective view showing the schematic configuration of a magnetic recording head according to the embodiment of the invention.

Figure 2:
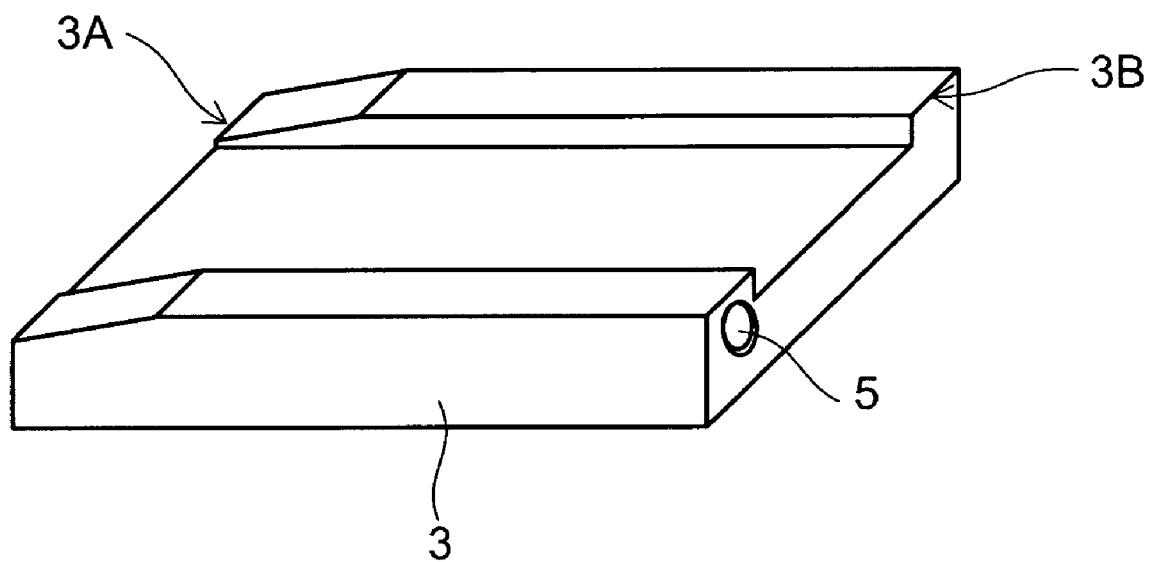
FIG. 2 is a perspective view showing a head slider on which this magnetic recording head is mounted.

FIG. 2 is a perspective view showing a head slider on which this magnetic recording head is mounted.

FIG. 3 is a schematic view illustrating the configuration of a spin oscillation device provided in this magnetic recording head.

The magnetic recording head 5 of this embodiment comprises a reproducing head section 70 and a writing head section 60. The reproducing head section 70 comprises a magnetic shield layer 72a, a magnetic shield layer 72b, and a magnetic reproducing device 71 sandwiched between the magnetic shield layer 72a and the magnetic shield layer 72b. The writing head section 60 comprises a recording magnetic pole 61, a return path (auxiliary magnetic pole) 62, an excitation coil 63, and a spin oscillation device 10. The components of the reproducing head section 70 and the components of the writing head section 60 are separated from each other by alumina or other insulators (not shown). The magnetic reproducing device 71 can be a GMR device or a TMR device. In order to enhance reproducing resolution, the magnetic reproducing device 71 is placed between the two magnetic shield layers 72a and 72b.

The magnetic recording head 5 is mounted on a head slider 3 as shown in FIG. 2. The head slider 3, illustratively made of $Al_2O_3$/TiC, is designed and worked so that it can move relative to a magnetic recording medium 80 (see FIG. 1) such as a magnetic disk while floating thereabove or being in contact therewith. The head slider 3 has an air inflow side 3A and an air outflow side 3B, and the magnetic recording head 5 is placed illustratively on the side surface of the air outflow side 3B.

The magnetic recording medium 80 has a medium substrate 82 and a magnetic recording layer 81 provided thereon. The magnetization of the magnetic recording layer 81 is controlled to a prescribed direction by the magnetic field applied from the writing head section 60, and thereby writing is performed. The reproducing head section 70 reads the magnetization direction of the magnetic recording layer 81.

In a writing head consisting only of the recording magnetic pole 61, the recording magnetic field is generated primarily in the perpendicular component, and there may be cases where an oblique recording magnetic field is not sufficiently generated inside the magnetic recording medium 80. Hence it is preferable to place a return path (auxiliary magnetic pole) 62 near the recording magnetic pole 61. Furthermore, the leakage recording magnetic field from the recording magnetic pole 61 may affect the magnetization 84 of adjacent tracks or adjacent bits. Hence, besides the auxiliary magnetic pole 62, an additional magnetic shield (not shown) can be provided so as to face or surround the recording magnetic pole 61, thereby reducing the leakage recording magnetic field from the recording magnetic pole 61 to the magnetic recording medium 80.

FIG. 3 is a schematic view illustrating the structure of the spin oscillation device 10.

In FIG. 3, the spin oscillation device 10 and the recording magnetic pole 61 are viewed obliquely from upper right with the X direction and the Y direction in FIG. 1 directed to the foreground and the right side, respectively. The components including the auxiliary magnetic pole 62, other than the spin oscillation device 10 and the recording magnetic pole 61, are omitted for convenience.

The spin oscillation device 10 has a laminated structure sequentially including a first electrode layer 41, a spin polarization layer (third magnetic layer) 30 with its magnetization 301 oriented generally parallel (FIG. 3A) or generally perpendicular (FIG. 3B) to the film plane, a nonmagnetic layer 22 (Cu, Au, Ag, etc.) having high spin transmissivity, a first spin oscillation layer (first magnetic layer) 10a, a first nonmagnetic layer 21, a second spin oscillation layer (second magnetic layer) 10b, and a second electrode layer 42. As shown in FIG. 1, the spin polarization layer 30, the nonmagnetic layer 22, the first nonmagnetic layer 21, and the second spin oscillation layer 10b are laminated in a direction generally parallel to a side surface of the recording magnetic pole 61, which is intersecting with the medium facing surface and generally perpendicular to the longitudinal direction (x-direction) of a recording track formed in the magnetic recording medium 80.

The first electrode layer 41 and the second electrode layer 42 are made of Ti or Cu.

The first spin oscillation layer 10a can be formed from a magnetic layer with its magnetization 10a1 oriented in the film plane.

The first nonmagnetic layer 21 is made of a nonmagnetic metal layer of Cu or the like.

The second spin oscillation layer 10b can be formed from a magnetic layer with its magnetization 10b1 oriented in the film plane.

The first spin oscillation layer 10a and the second spin oscillation layer 10b are antiferromagnetically coupled and/or magnetostatically coupled to each other via the first nonmagnetic layer 21 (which is preferably made of a noble metal such as Cu, Pt, Au, Ag, Pd, and Ru, or can be made of a nonmagnetic transition metal such as Cr, Rh, Mo, and W) so that the respective magnetizations are antiparallel to each other. A constant current source 50 suitably placed inside or outside the magnetic head can be used to pass a prescribed DC current through the pair of spin oscillation layers 10a, 10b via the electrode layer 41 and the electrode layer 42.

The antiferromagnetic coupling and/or magnetostatic coupling described above can be designed to achieve either or both of the couplings by suitably adjusting the material and thickness of the first nonmagnetic layer 21. Furthermore, the spin polarization layer 30 also serves as a magnetization pinning layer. Hence it is preferable to suitably select the material and thickness of the nonmagnetic layer 22 to avoid excessive magnetic coupling between the spin polarization layer 30 and the first spin oscillation layer 10a so that the magnetization 301 of the spin polarization layer is constantly stable.

With regard to the material of the first spin oscillation layer 10a, the second spin oscillation layer 10b, and the spin polarization layer 30, they can be a soft magnetic layer of CoFe, CoNiFe, NiFe, CoZrNb, FeN, FeSi, or FeAlSi having relatively high saturation magnetic flux density and having magnetic anisotropy directed in the film plane, or a CoCr-based magnetic alloy film with its magnetization oriented in the film plane. Furthermore, it is possible to use a material layer having good perpendicular orientation with the magnetization oriented perpendicular to the film plane, such as a CoCrPt, CoCrTa, CoCrTaPt, CoCrTaNb, and other CoCr-based magnetic layer, a TbFeCo or other RE-TM amorphous alloy magnetic layer, or a Co/Pd, Co/Pt, CoCrTa/Pd, or other Co artificial lattice magnetic layer. If higher magnetic anisotropy energy (Ku) is required, it is also possible to suitably use a CoPt-based or FePt-based alloy magnetic layer, or a SmCo-based alloy magnetic layer. The first nonmagnetic layer and the second nonmagnetic layer are preferably made of a noble metal such as Cu, Pt, Au, Ag, Pd, and Ru, or can be made of a nonmagnetic transition metal such as Cr, Rh, Mo, and W.

With regard to the material of the first spin oscillation layer 10a, the second spin oscillation layer 10b, and the spin polarization layer 30, the above magnetic layer can be a laminated ferri layer. This is intended for increasing the oscillation frequency of the spin oscillation layers 10a, 10b, or for efficiently pinning the magnetization of the spin polarization layer 30. Furthermore, with regard to the material of the first spin oscillation layer 10a, the second spin oscillation layer 10b, and the spin polarization layer 30, it is also possible to laminate more than one of the above materials. This is intended for adjusting the saturation magnetic flux density (Bs) and the anisotropic magnetic field (Hk) of the spin oscillation layers 10a, 10b and the spin polarization layer 30.

In this embodiment, the gap (between the facing surfaces of the first spin oscillation layer 10a and the second spin oscillation layer 10b) 21a of the spin oscillation device 10 is configured to be generally perpendicular to the side surface 61a of the recording magnetic pole 61 intersecting with the recording medium facing surface 100. More specifically, the first spin oscillation layer 10a and the second spin oscillation layer 10b are laminated in the direction generally parallel to the recording medium facing surface 100 and generally parallel to the side surface 61a of the recording magnetic pole 61 intersecting with the recording medium facing surface 100. For example, in the example shown in FIGS. 1 and 3, the side surface 61a of the recording magnetic pole 61 is parallel to the Y direction, whereas the first spin oscillation layer 10a and the second spin oscillation layer 10b are laminated parallel to the Y direction.

By this configuration, the spin oscillation device 10 can be placed close to the recording magnetic pole 61 so that the radio-frequency magnetic field emitted from the spin oscillation device 10 can easily coincide with and overlap the recording magnetic field emitted from the recording magnetic pole 61. Furthermore, the device size of the spin oscillation device 10 (in the direction parallel to the side surface 61a of the recording magnetic pole and perpendicular to the medium facing surface 100) can be configured relatively freely. That is, the spin oscillation device 10 can have a large size in the Y direction and the Z direction in FIGS. 1 and 3. Hence the size of the spin oscillation device 10 can be optimally designed in relation to the recording density. Moreover, the spin oscillation layers 10a, 10b are magnetized parallel to the side surface 61a of the recording magnetic pole 61 intersecting with the recording medium facing surface 100 and undergo precession 10a2, 10b2 about the magnetization direction. Hence the size of the spin oscillation layers 10a, 10b in the direction of the recording magnetic pole 61 is preferably equal to the dimension of the spin oscillation layers 10a, 10b in the direction perpendicular to the medium facing surface (air bearing surface, ABS).

Figure 4:
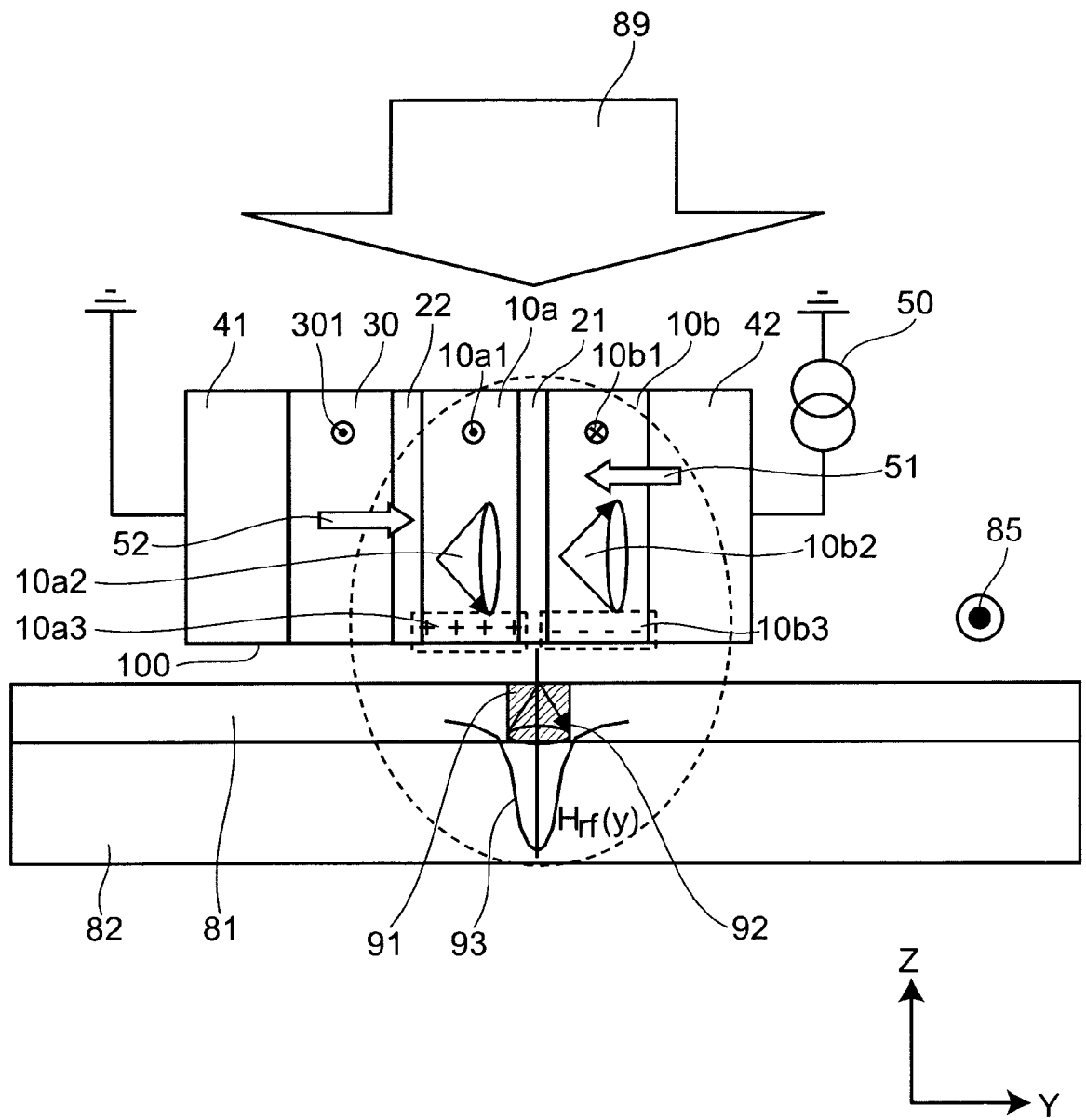
FIG. 4 is a conceptual view for illustrating the operation of the magnetic recording head of this embodiment.
Figure 5:
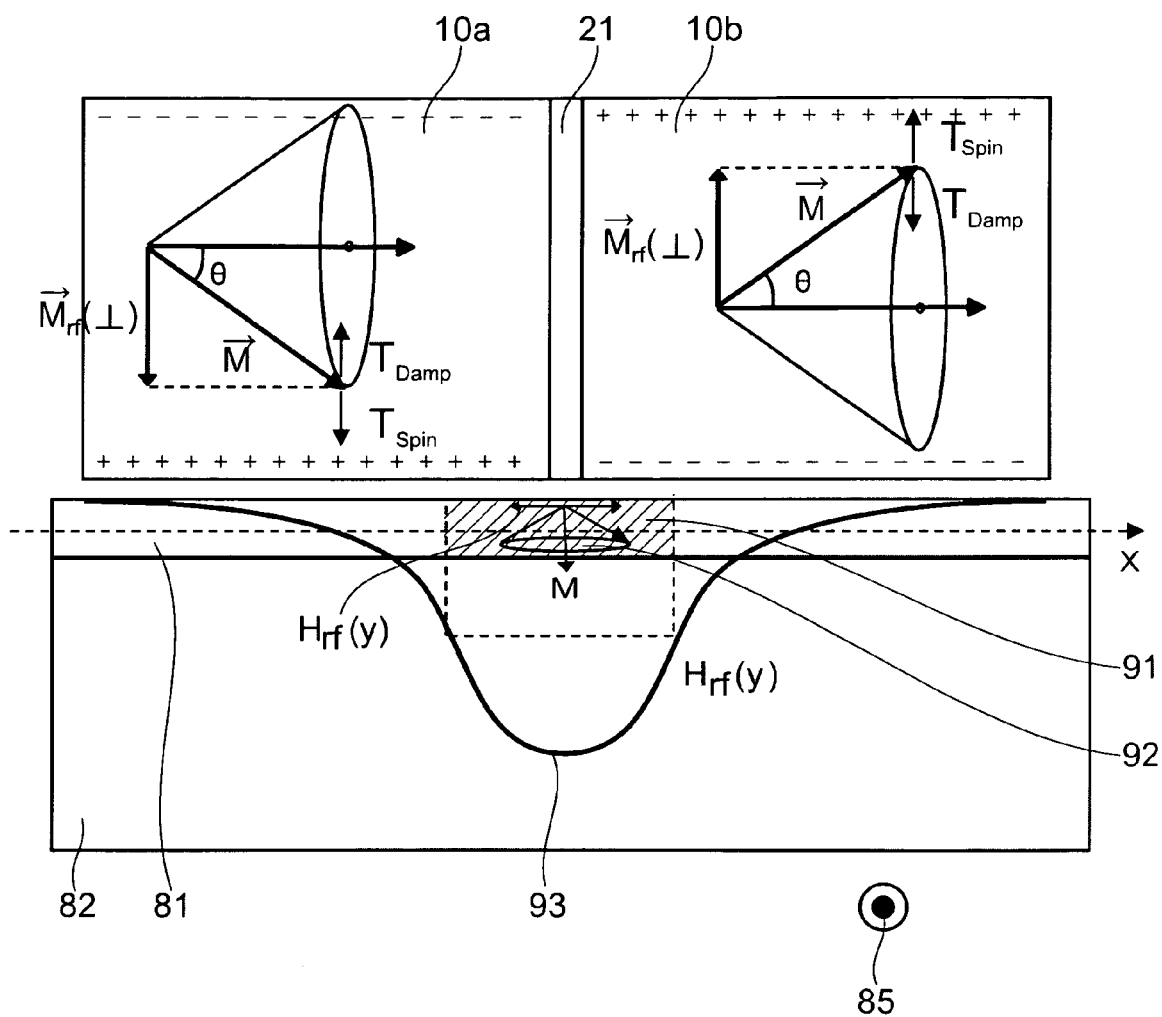
FIG. 5 is a conceptual view for illustrating the operation of the magnetic recording head of this embodiment.

FIGS. 4 and 5 are conceptual views for illustrating the operation of the magnetic recording head of this embodiment. While FIG. 4 illustrates the case where the magnetization 301 of the spin polarization layer 30 is directed in the film plane, the case of the direction perpendicular to the film plane (see FIG. 3B) is almost the same.

When a DC current 51 is passed sequentially through the electrode layer 42, the pair of spin oscillation layers 10b, 10a, and the electrode layer 41, an electron flow 52 is passed in the opposite direction. The spin of the electrons flowing from the electrode layer 41 into the spin polarization layer 30 and passing therethrough is polarized in the direction of the magnetization 301 oriented generally parallel (or generally perpendicular) to the film plane of the spin polarization layer 30. The polarized electron flow 52 travels through the nonmagnetic layer 22 having high spin transmissivity and flows into the first spin oscillation layer 10a.

If the magnetization 10a1 of the first spin oscillation layer 10a is oriented in the film plane, the magnetization 10a1 is directed orthogonal to the magnetization 301, and hence the magnetization 10a1 undergoes ferromagnetic resonance (precession of magnetization) by receiving a large spin torque. Thus a radio-frequency oscillation phenomenon occurs in the first spin oscillation layer 10a in the range of several GHz to over 100 GHz depending on its magnetic characteristics. At this time, the perpendicular-to-plane component $M_{rf}(\perp)$ of the radio-frequency magnetization $M_{rf}$ produced in the first spin oscillation layer 10a induces a radio-frequency magnetic charge at the end of the first spin oscillation layer 10a on the medium facing surface 100 side.

As a result of investigations, the inventors have found that such ferromagnetic resonance can be produced irrespective of whether the magnetization 301 of the spin polarization layer 30 is directed generally parallel or generally perpendicular to the film plane. In the case of this example, it turns out that a more prominent ferromagnetic resonance can be produced particularly when the magnetization 301 is generally parallel to the film plane.

Next, the electron flow 52, which has traveled from the first spin oscillation layer 10a and passed through the nonmagnetic layer 21 having high spin transmissivity, flows into the second spin oscillation layer 10b. Then ferromagnetic resonance occurs also in the second spin oscillation layer 10b on the same principle as the ferromagnetic resonance produced in the first spin oscillation layer 10a described above. Here, the magnetizations of the first spin oscillation layer 10a and the second spin oscillation layer 10b are antiferromagnetically coupled and/or magnetostatically coupled to each other by suitably selecting the material and thickness of the nonmagnetic layer 21 interposed therebetween. Then the magnetization 10b1 of the second spin oscillation layer 10b is constantly antiparallel to the magnetization 10a1 of the first spin oscillation layer 10a.

If this state is maintained, the magnetization 10b1 of the second spin oscillation layer 10b and the magnetization 10a1 of the first spin oscillation layer 10a are energetically more stable when they undergo precession in opposite phase. Hence, when the second spin oscillation layer 10b undergoes radio-frequency oscillation (precession), the radio-frequency magnetic charge occurring at the end of the second spin oscillation layer 10b on the medium facing surface 100 side is in opposite phase to the above-described radio-frequency magnetic charge at the end of the first spin oscillation layer 10a on the medium facing surface 100 side. Thus, as viewed from the medium, radio-frequency magnetic charges in opposite phase to each other are produced at the respective ends of the pair of spin oscillation layers on the medium facing surface 100 side as shown in FIG. 5. Hence a radio-frequency magnetic field dominated by the component $H_{rf}(Y)$ in the medium plane is generated from the ends of the pair of spin oscillation layers, and can be applied to the magnetic recording layer 81 of the medium.

Here, the medium travel direction 85 is the X direction (see FIGS. 1 and 3). If the magnetic characteristics and thickness of the first spin oscillation layer 10a and the second spin oscillation layer 10b are selected to be equal, $H_{rf}(Y)$ is maximized in the vicinity of the position directly underlying the center of the nonmagnetic layer 21, and its strength is attenuated with the distance from the directly underlying position in the Y direction (track width direction). More specifically, if the first spin oscillation layer 10a and the second spin oscillation layer 10b have an equal thickness, denoted by $t_1$ ($=t_2$), and equal saturation magnetization, and the spacing from the pair of spin oscillation layers to the recording layer of the magnetic recording medium is comparable to or smaller than $t_1$, $t_2$, then the resolution (half width) of the distribution 93 of $H_{rf}(Y)$ is approximately given by the sum of $t_1$ and $t_{21}/2$, i.e., $t_1+(t_{21}/2)$, where $t_{21}$ is the thickness of the nonmagnetic layer 21.

By way of example, if $t_1$ and $t_2$ are selected to be 10 nm and $t_{21}$ to be 1 nm (corresponding to the case where the selected material is Ru and the pair of spin oscillation layers undergo relatively strong antiferromagnetic coupling), then the half width of the distribution of $H_{rf}(Y)$ is approximately 10.5 nm.

As shown in FIG. 5, when the magnetic head is opposed to the perpendicular magnetic recording medium with the oscillation frequency of the pair of spin oscillation layers set equal to or near the ferromagnetic resonance frequency of the medium magnetization, a radio-frequency magnetic field $H_{rf}$ (Y) directed orthogonal to the perpendicular magnetization M in the recording layer region 91 (corresponding to the resolution as described above) is applied thereto from the pair of spin oscillation layers. Thus the magnetization in the recording layer region 91 of the recording layer 81 undergoes precession due to ferromagnetic resonance, and hence the magnetization in the recording layer region 91 can be reversed very easily.

FIG. 6 is a schematic view for illustrating the relationship between the magnetization easy axis of the recording layer and the radio-frequency magnetic field.

Figure 6A:
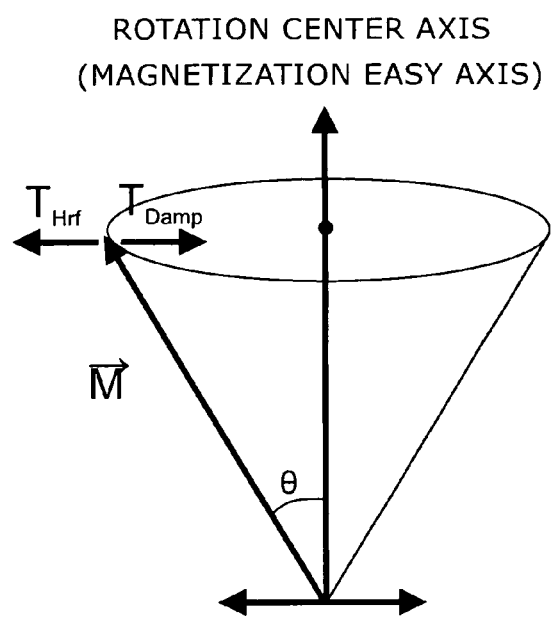
FIGS. 6A and 6B are schematic views for illustrating the relationship between the magnetization easy axis of the recording layer and the radio-frequency magnetic field.
Figure 6B:
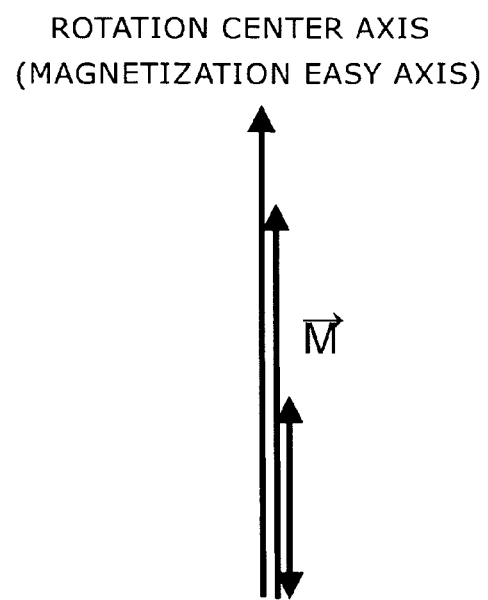

As shown in FIG. 6A, to efficiently reduce the coercivity of the recording layer 81, it is necessary to apply a radio-frequency magnetic field to the magnetic recording layer 81 in a direction orthogonal to its magnetization easy axis (the orientation of magnetization) to impart a torque $T_{Hrf}$ to the magnetization, thereby causing ferromagnetic resonance (precession). In contrast, as shown in FIG. 6B, a radio-frequency magnetic field applied parallel to the magnetization easy axis does not produce an effective torque on the magnetization, and ferromagnetic resonance is difficult to occur. Hence, in the case of using a perpendicular recording medium, to efficiently reduce its coercivity, it is necessary to apply to the recording layer a radio-frequency magnetic field dominated by the component in the medium plane.

However, the radio-frequency magnetic field generated by the spin oscillation layers of the conventional structure disclosed in US Patent Application Publication No. 2005/0023938 and US Patent Application Publication No. 2005/0219771 is dominated by the component perpendicular to the medium plane, and this component is parallel to the magnetization of the recording layer. Hence application of this radio-frequency magnetic field is not effective at causing ferromagnetic resonance (precession) in the magnetization of the recording site. Thus, unfortunately, it is difficult to effectively reduce the coercivity of the recording site.

In contrast, this embodiment enables highly efficient radio-frequency assisted magnetic recording onto a perpendicular magnetic recording medium having high coercivity, which has difficulty in writing by the conventional magnetic recording techniques. Thus it is possible to provide a magnetic recording head and a magnetic recording apparatus based thereon, suitable for ultrahigh-density magnetic recording in the future.

Figure 7:
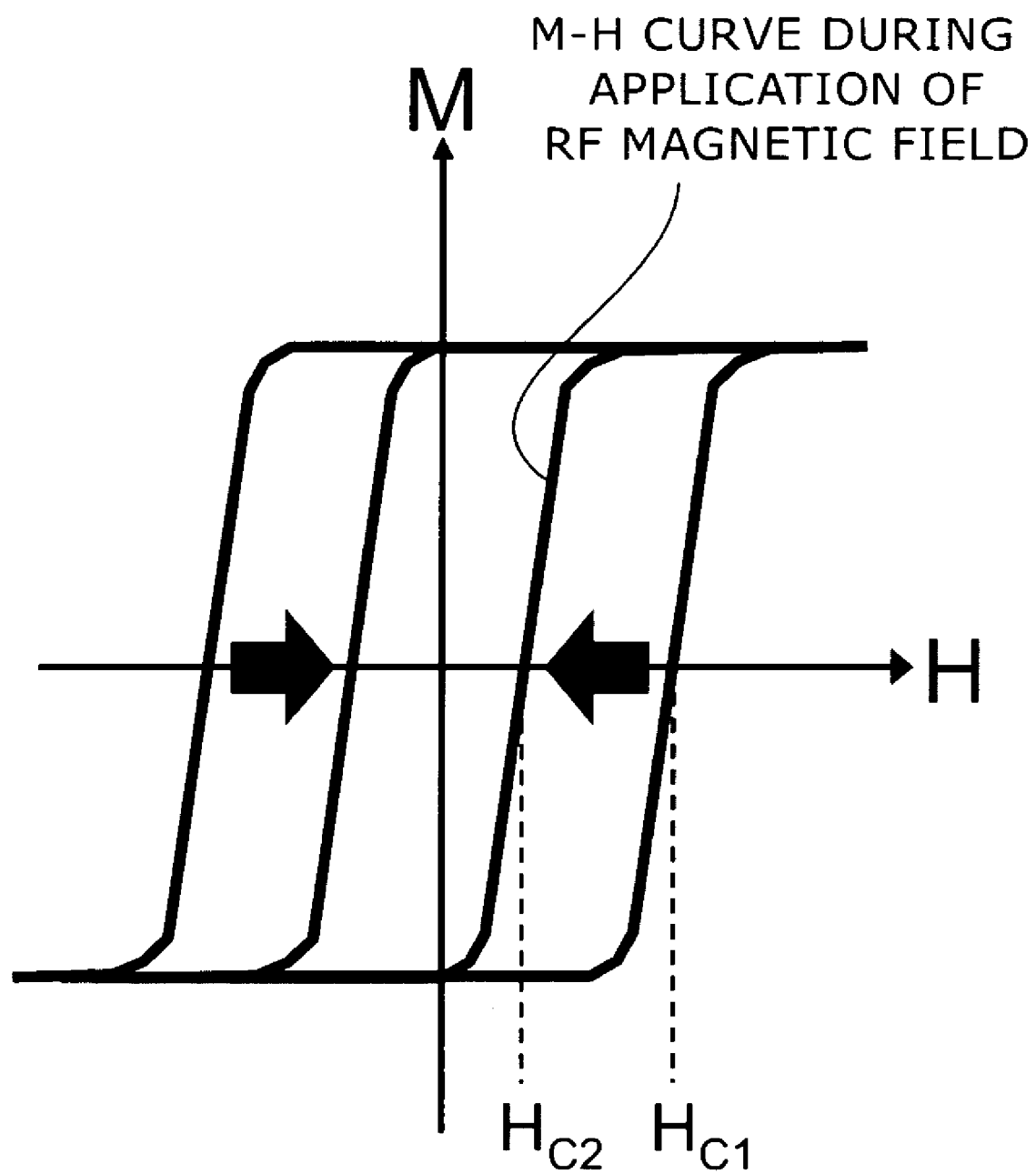
FIG. 7 is a graph illustrating the decrease of coercivity in the recording layer.

FIG. 7 is a graph illustrating the decrease of coercivity in the recording layer.

Even in a perpendicular magnetic recording medium, the coercivity $H_{c1}$ of the recording layer 81 can be decreased to $H_{c2}$ by application of a radio-frequency magnetic field in a direction parallel to the medium plane of the recording layer 81. At this time of decreased coercivity, a recording magnetic field can be applied to the recording layer region 91 from the recording magnetic pole 61 placed close to the pair of spin oscillation layers. Then the magnetization of the recording layer region 91 is easily reversed, and writing of information is completed.

According to this embodiment, it is considered that the coercivity can be decreased to ½ to ⅓ or less of the coercivity for no radio-frequency assistance. Hence, by the radio-frequency assisted magnetic recording based on the pair of spin oscillation layers as described above, even a perpendicular magnetic recording medium having higher magnetic anisotropy energy (i.e., higher coercivity), which in turn has a higher recording density potential, can be used for recording by the conventional recording magnetic pole 61. Thus this embodiment has a marked effect of being able to continue to increase the recording density of HDD and other magnetic recording apparatuses in the future.

In this embodiment, it is preferable that the magnetic anisotropy energy (Ku) of the first spin oscillation layer 10a be equal or generally equal to that of the second spin oscillation layer 10b. The oscillation frequency of the spin oscillation layer is determined by the magnitude of the magnetic anisotropy energy (Ku) of the device. If the magnetic anisotropy energy (Ku) of the first spin oscillation layer 10a is different from that of the second spin oscillation layer 10b, oscillation of one device is incompatible with oscillation of the other device, failing to achieve the opposite-phase precession as described above.

To achieve radio-frequency assisted magnetic recording with higher resolution, the in-plane component $H_{rf}(Y)$ of the radio-frequency magnetic field generated from the first spin oscillation layer 10a and the second spin oscillation layer 10b is preferably symmetric with respect to the medium travel direction. To this end, denoting the saturation magnetization and thickness of the first spin oscillation layer 10a and the second spin oscillation layer 10b by $M_{s1}$, $t_1$, and $M_{s2}$, $t_2$, respectively, it is preferable that the product $M_{s1} \times t_1$ be generally equal to the product $M_{s2} \times t_2$.

Figure 8:
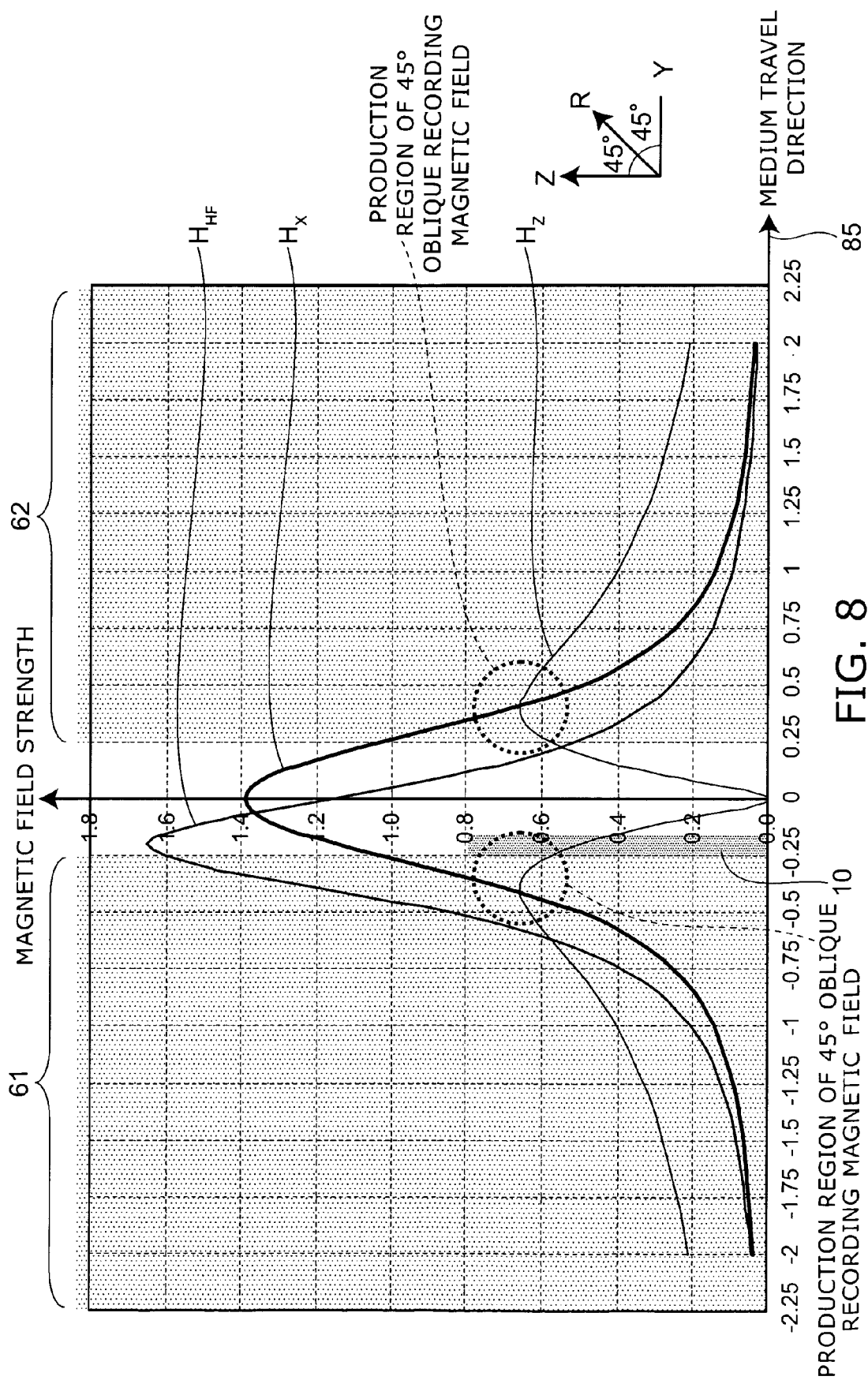
FIG. 8 is a graph showing the positional relationship of the track longitudinal direction to the magnetic fields.

FIG. 8 is a graph showing the positional relationship of the track longitudinal direction (X direction) to the strength of the in-plane recording magnetic field, the perpendicular recording magnetic field, and the radio-frequency magnetic field produced at the track center in the vicinity of the recording gap 66 by the magnetic recording head shown in FIG. 1. It is noted that FIG. 8 shows the absolute value of magnetic field strength. FIG. 8 also shows the positional relationship of the recording magnetic pole 61, the auxiliary magnetic pole 62, and the spin oscillation device 10 in the X direction.

The first spin oscillation layer 10a and the second spin oscillation layer 10b oscillate in opposite phase. Consequently, the radio-frequency magnetic field generated by the spin oscillation device 10 in the magnetic recording medium 80 is dominated by the in-plane component. The strength of the in-plane component of the radio-frequency magnetic field $H_{HF}$ applied to the magnetic recording medium 80 is maximized in the area directly below the spin oscillation device 10. Because the first spin oscillation layer 10a and the second spin oscillation layer 10b oscillate in opposite phase, the strength of the in-plane radio-frequency magnetic field of the spin oscillation device 10 sharply decreases with the distance from the spin oscillation device 10. Hence the application region of the radio-frequency magnetic field from the spin oscillation device 10 is restricted only to the vicinity of the spin oscillation device 10.

The frequency of the radio-frequency magnetic field of the spin oscillation device 10 is preferably adjusted to correspond to the ferromagnetic resonance frequency of the medium. In that case, the magnetization 84 of the magnetic recording medium 80 subjected to the in-plane radio-frequency magnetic field of the spin oscillation device 10 undergoes ferromagnetic resonance. The reversal magnetic field of the magnetization 84 of the magnetic recording medium 80 under ferromagnetic resonance is ½ to ⅓ of the typical coercivity as described above with reference to FIG. 7.

On the other hand, the in-plane component of the recording magnetic field generated from the recording magnetic pole 61 and the auxiliary magnetic pole 62 by the excitation coil 63 illustratively has the maximum strength around the center of the recording gap 66 and decreases with the distance from the center of the recording gap 66. In contrast, the perpendicular component of the recording magnetic field illustratively tends to decrease around the center of the recording gap 66, increase around the end of the recording gap 66, and decrease with the distance from the recording gap 66 on the outside thereof.

At points displaced from the center of the recording gap 66 to the trailing side and the leading side, respectively, the curve Hx representing the strength of the in-plane component of the recording magnetic field intersects with the curve Hz representing the strength of the perpendicular component of the recording magnetic field. Around the intersection, the recording magnetic field is directed to the R direction (or its opposite direction), which is a resultant vector of the X direction and the Z direction shown in FIG. 8, that is, forms 45° with the magnetic recording medium 80. Magnetic recording based on such an oblique recording magnetic field enables recording with a magnetic field that is approximately half the typical coercivity of the magnetic recording medium 80.

The spin oscillation device 10 is displaced from the center of the recording gap 66 to the leading side. Thus the region subjected to the 45° oblique recording magnetic field from the recording magnetic pole 61 and the auxiliary magnetic pole 62 can be generally matched with the region subjected to the in-plane radio-frequency magnetic field of the spin oscillation device 10. Consequently, the effect of increasing the capability of magnetization reversal by ferromagnetic resonance can be combined synergistically with the effect of increasing the writing performance by oblique magnetic field recording, enabling writing to a magnetic recording medium 80 having a high coercivity that is four to six times the recording magnetic field. Hence this embodiment enables magnetic recording onto a magnetic recording medium 80 with higher coercivity (Hc) and higher magnetic anisotropy energy (Ku) suitable for high-density recording, and can exclude the effect of thermal fluctuations. Thus a remarkable effect of providing a high-density magnetic recording apparatus having high reliability is achieved.

Considering the presence of only the recording magnetic pole 61, the spin oscillation device 10 can be placed on either the trailing side or the leading side of the recording magnetic pole 61. This is because the in-plane radio-frequency magnetic field of the spin oscillation device 10 is steeper than the recording magnetic field of the recording magnetic pole 61.

However, if an auxiliary magnetic pole 62 is present, the recording magnetic field between the recording magnetic pole 61 and the auxiliary magnetic pole 62 is higher. Hence it is preferable to place the spin oscillation device 10 between the recording magnetic pole 61 and the auxiliary magnetic pole 62. Therefore, in the case where the auxiliary magnetic pole 62 is provided on the trailing side of the recording magnetic pole 61 as shown in FIG. 1, it is preferable to also place the spin oscillation device 10 on the trailing side of the recording magnetic pole 61.

Furthermore, during the write operation, a disturbing current such as eddy current occurs in the recording magnetic pole 61 and the auxiliary magnetic pole 62. Hence, if the recording magnetic pole 61 and the auxiliary magnetic pole 62 are used as electrodes for supplying current to the spin oscillation device 10, a noise current may flow into the spin oscillation device 10 during the write operation and prevent effective spin oscillation. Moreover, in this case, the recording magnetic pole 61 and the auxiliary magnetic pole 62 need to be separated from each other using alumina or other insulator (not shown), and then the recording magnetic pole 61 and the auxiliary magnetic pole 62 are separated from each other also magnetically. This results in increasing the reluctance (magnetoresistance) of the magnetic circuit composed of the recording magnetic pole 61 and the auxiliary magnetic pole 62, and unfortunately decreases the efficiency of generating a recording magnetic field by the excitation coil 63. Hence, preferably, an electrode electrically isolated from the recording magnetic pole 61 and the auxiliary magnetic pole 62 is placed parallel to the side surface 61a of the recording magnetic pole 61 intersecting with the recording medium facing surface 100, and a current is supplied to the spin oscillation device 10 through this electrode. Also preferably, the recording magnetic pole 61 and the auxiliary magnetic pole 62 are magnetically bonded to each other.

Figure 9:
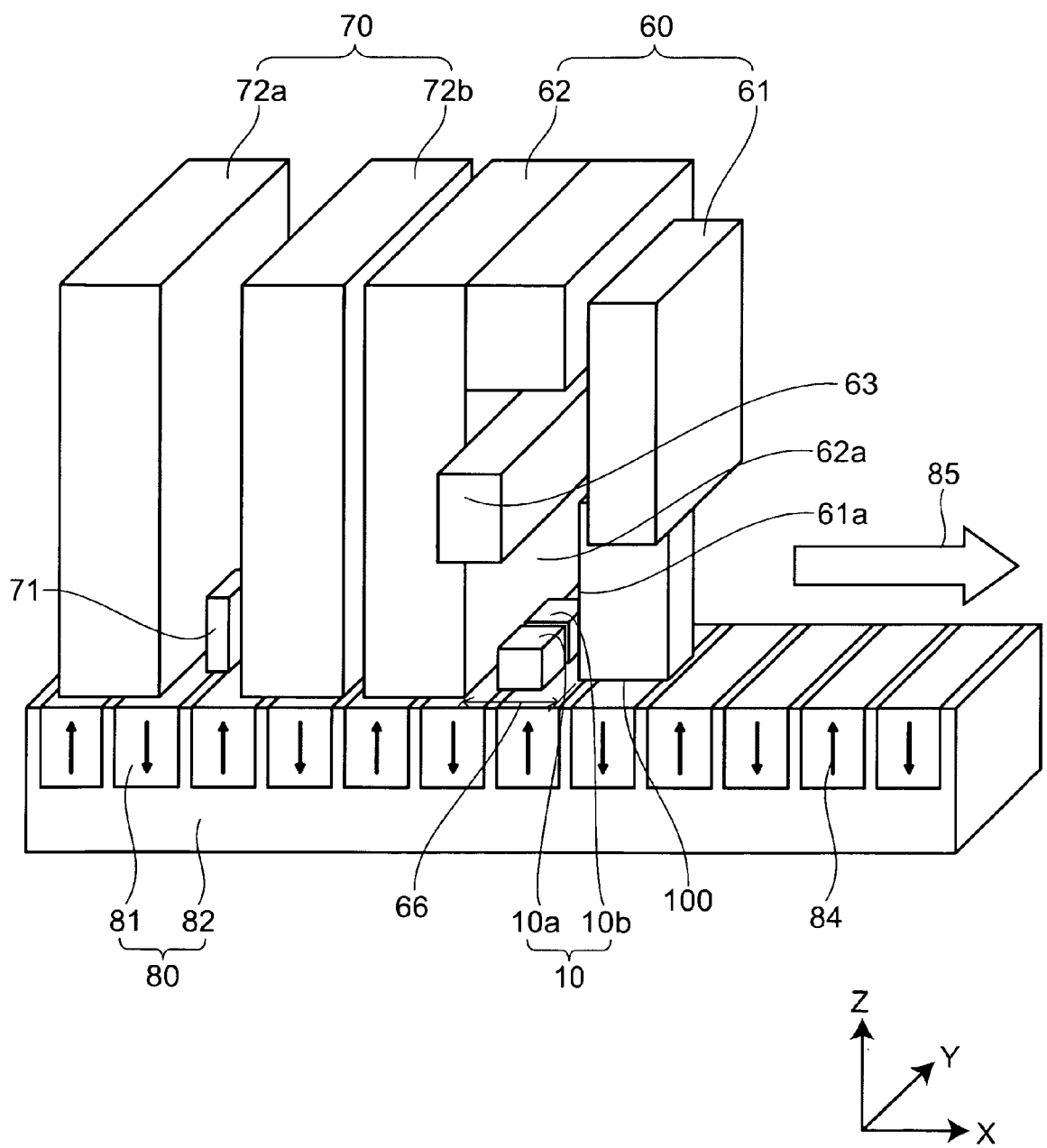
FIG. 9 is a schematic perspective view showing a variation of the magnetic head of the first embodiment.

FIG. 9 is a schematic perspective view showing a variation of the magnetic head of this embodiment.

In this variation, the auxiliary magnetic pole 62 is placed on the leading side of the recording magnetic pole 61. Hence, to achieve good recording characteristics, it is preferable to place the spin oscillation device 10 on the leading side of the recording magnetic pole 61 so that the application region of the oblique magnetic field generated from the recording magnetic pole 61 and the auxiliary magnetic pole 62 is matched with the application region of the radio-frequency oscillation magnetic field from the spin oscillation device 10. The strength of the in-plane radio-frequency magnetic field generated by the spin oscillation device 10 has a very steep dependence on the track direction as described above with reference to FIG. 5, and this steepness determines the recording resolution. The magnetic recording head with the spin oscillation device 10 placed on the leading side of the recording magnetic pole 61 can achieve the same characteristics as the magnetic recording head with the spin oscillation device 10 placed on the trailing side. The remaining head configuration, operating principle, and effect in this variation are the same as those described above with reference to the first embodiment.

Next, a second embodiment of the invention is described.

Figure 10:
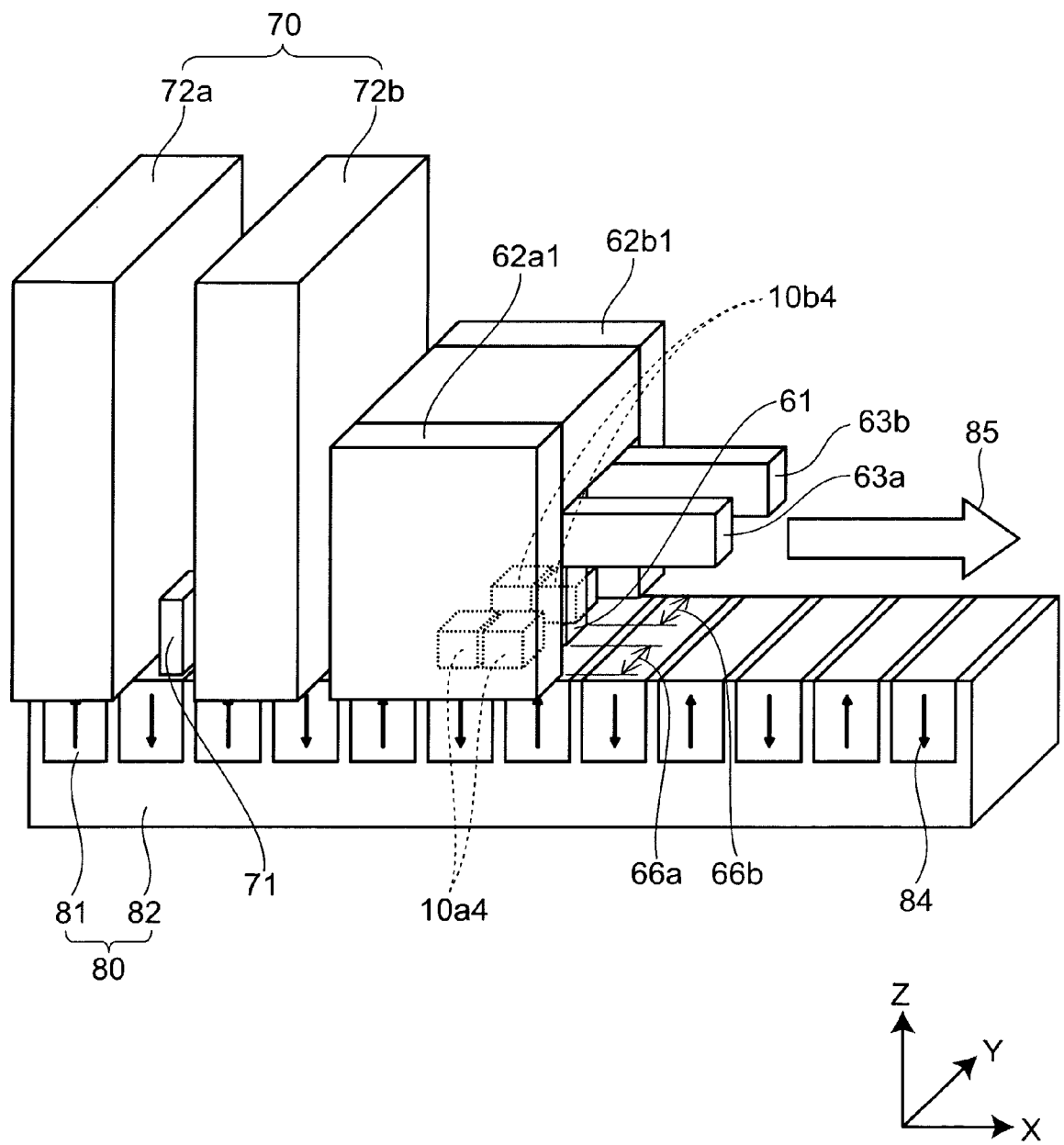
FIG. 10 is a schematic view showing the schematic configuration of a recording head according to a second embodiment of the invention.

FIG. 10 is a schematic view showing the schematic configuration of a recording head according to the second embodiment of the invention.

In this embodiment, a first spin oscillation device 10a4 and a second spin oscillation device 10b4 are provided so as to sandwich a recording magnetic pole 61 in the track width direction (Y direction). Furthermore, a first auxiliary magnetic pole 62a1 and a second auxiliary magnetic pole 62b1 are provided so as to sandwich the recording magnetic pole 61, the first spin oscillation device 10a4, and the second spin oscillation device 10b4 in the track width direction (Y direction). The first spin oscillation device 10a4 and the second spin oscillation device 10b4 have the structure as described above with reference to FIG. 3.

The gap (between the facing surfaces of the first spin oscillation layer 10a and the second spin oscillation layer 10b) 21a (see FIG. 3) of each spin oscillation device is configured to be generally perpendicular to the X direction. More specifically, the first spin oscillation layer 10a and the second spin oscillation layer 10b included in each of the first spin oscillation device 10a4 and the second spin oscillation device 10b4 are laminated in the direction generally parallel to the recording medium facing surface 100 and generally parallel to the medium travel direction 85 (i.e., X direction). In other words, as shown in FIG. 10, the first spin oscillation layer 10a and the second spin oscillation layer 10b are laminated in a direction generally parallel to a side surface of the recording magnetic pole 61, which is intersecting with the medium facing surface and generally parallel to the longitudinal direction (x-direction) of a recording track formed in the magnetic recording medium 80.

By this configuration, the spin oscillation device 10 can be placed close to the recording magnetic pole 61 so that the radio-frequency magnetic field emitted from the spin oscillation device 10 can easily coincide with and overlap the recording magnetic field emitted from the recording magnetic pole 61. Furthermore, the device size of the first spin oscillation device 10a4 and the second spin oscillation device 10b4 (in the X direction and the Z direction) can be configured relatively freely. That is, the spin oscillation device 10a4, 10b4 can have a large size in the X direction and the Z direction in FIG. 10. Hence the size of the spin oscillation device 10 can be optimally designed in relation to the recording density.

Here, the first spin oscillation device 10a4 and the second spin oscillation device 10b4 can be film-formed simultaneously, and then can be divided into two spin oscillation devices using lithography and other patterning techniques. Thus the first spin oscillation device 10a4 and the second spin oscillation device 10b4 have the same lamination structure and are coplanar to each other, and hence the misalignment of recording bits in the track direction can be reduced.

Figure 11:
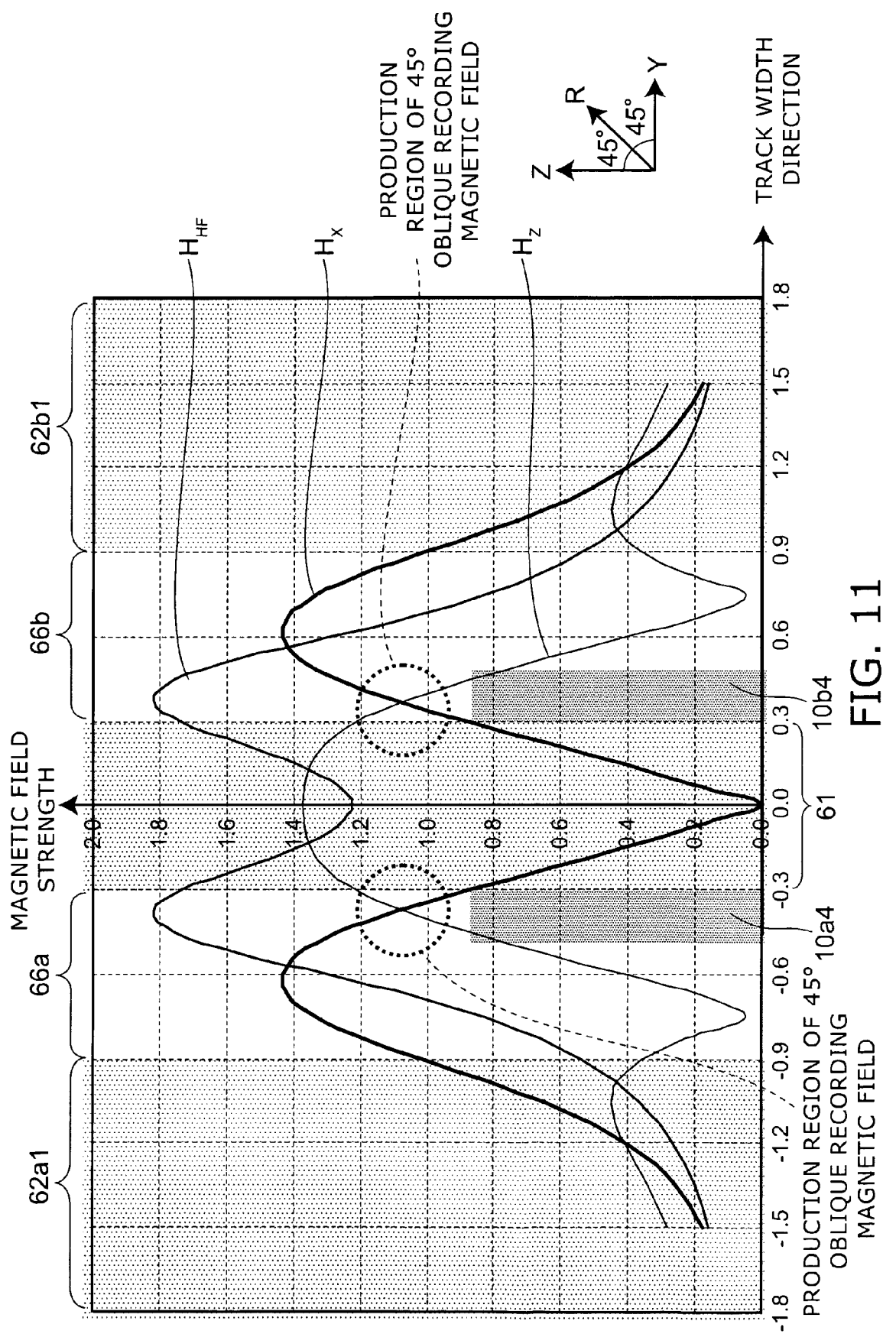
FIG. 11 is a graph showing the positional relationship of the track width direction to the strength of the magnetic fields.

FIG. 11 is a graph showing the positional relationship of the track width direction to the strength of the in-plane recording magnetic field, the perpendicular recording magnetic field, and the radio-frequency magnetic field produced in the vicinity of the recording gaps 66a, 66b of the spin oscillation device 10 by the magnetic head of this embodiment. It is noted that FIG. 11 shows the absolute value of magnetic field strength. FIG. 11 also shows the positional relationship of the recording magnetic pole 61, the auxiliary magnetic pole 62, and the spin oscillation device 10 in the Y direction.

In this embodiment, the auxiliary magnetic poles 62a1, 62b1 opposed to the recording magnetic pole 61 are provided in the track width direction (Y direction). Thus the oblique magnetic field generated by the recording magnetic pole 61 is restricted to the track width direction, and leakage of the oblique magnetic field to the track longitudinal direction (X direction) is decreased. Hence the oblique magnetic field can be intensively applied only to a recording target, or a recording bit region.

More specifically, the strength of the in-plane component Hx of the recording magnetic field produced by the recording magnetic pole 61 and the auxiliary magnetic poles 62a1, 62b1 increases around the center of the magnetic gaps 66a, 66b on both sides of the recording magnetic pole 61, and decreases with the distance therefrom. On the other hand, the strength of the perpendicular component Hz of the recording magnetic field produced by the recording magnetic pole 61 and the auxiliary magnetic poles 62a1, 62b1 increases in the vicinity of the recording magnetic pole 61, and illustratively decreases in the vicinity of both ends of the magnetic gaps 66a, 66b.

In the example shown in FIG. 11, in the vicinity of the recording magnetic pole 61, the in-plane component Hx and the perpendicular component Hz of the recording magnetic field generally correspond to each other to produce an oblique magnetic field inclined at 45° (R direction or its opposite direction) with respect to the medium major surface.

As shown in FIG. 11, the first spin oscillation device 10a4 and the second spin oscillation device 10b4 are placed so that the application region of the 45° (R direction or its opposite direction) oblique recording magnetic field from the recording magnetic pole 61 corresponds to the application region of the radio-frequency magnetic field $H_{HF}$ from the spin oscillation device 10. Hence writing to the magnetic recording medium 80 having high coercivity (Hc) and high magnetic anisotropy energy (Ku) can be performed more efficiently. The remaining head configuration, operating principle, and effect in this embodiment are the same as those described above with reference to the first embodiment.

Figure 12:
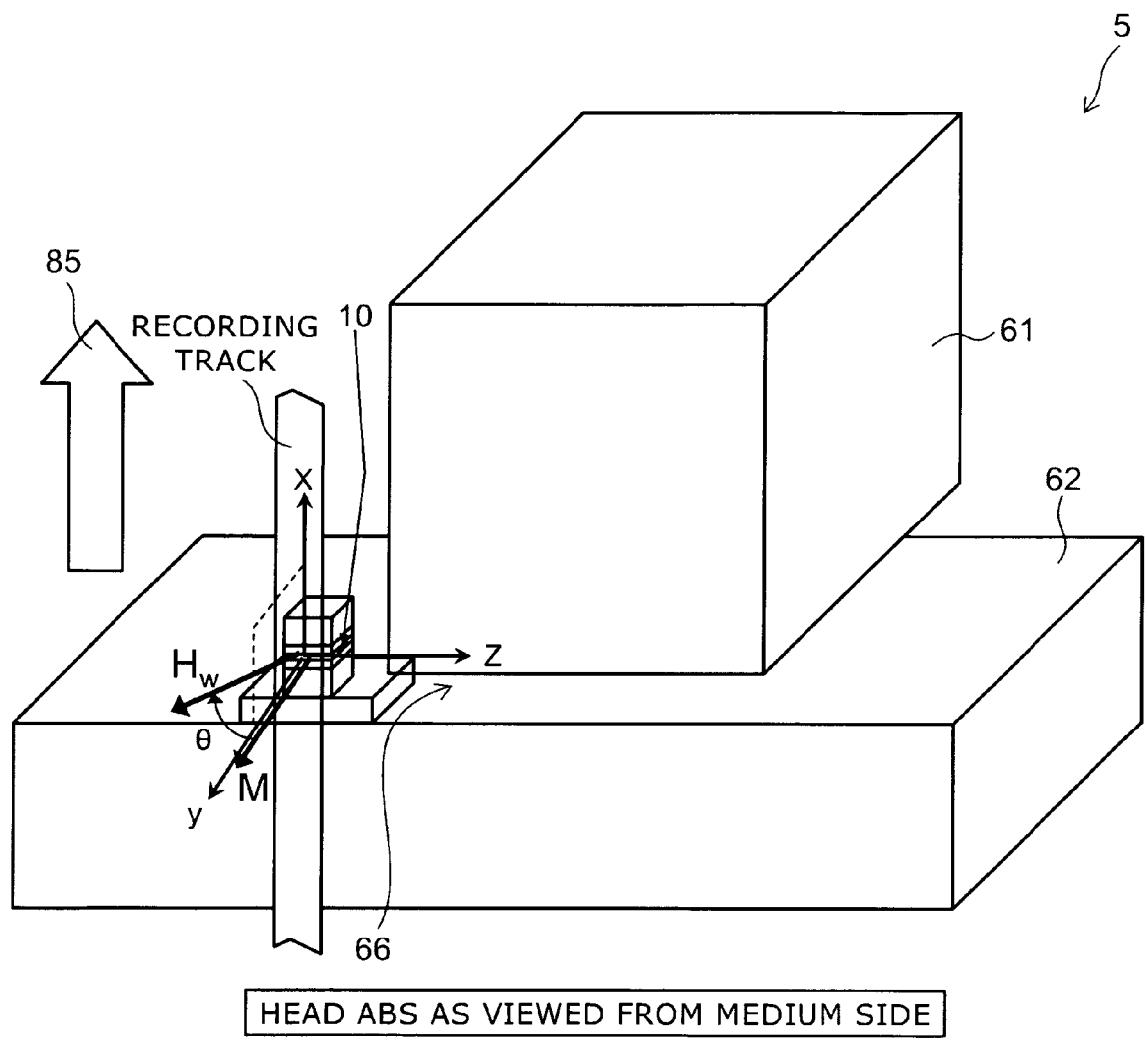
FIG. 12 is a perspective view showing the main part of a magnetic head according to a third embodiment of the invention.

FIG. 12 is a perspective view showing the main part of a magnetic head according to a third embodiment of the invention. More specifically, FIG. 12 is a perspective view of the magnetic head 5 as viewed from the medium facing surface.

The recording head 5 of this embodiment also includes a recording magnetic pole 61, an auxiliary magnetic pole 62 forming a magnetic core (not entirely shown) in combination with the recording magnetic pole 61, and a coil (not shown) coupling the recording magnetic pole 61 with the auxiliary magnetic pole 62. The magnetic recording medium is assumed to be a perpendicular magnetic recording medium. In this embodiment, as described above with reference to FIG. 3, the spin oscillation device 10 having a pair of spin oscillation layers is placed close to the gap 66 between the recording magnetic pole 61 and the auxiliary magnetic pole 62.

The gap (between the facing surfaces of the first spin oscillation layer 10a and the second spin oscillation layer 10b) 21a (see FIG. 3) of the spin oscillation device is configured to be generally perpendicular to the X direction. More specifically, the first spin oscillation layer 10a and the second spin oscillation layer 10b included in the spin oscillation device 10 are laminated in the direction generally parallel to the recording medium facing surface 100 and generally parallel to the medium travel direction 85 (i.e., X direction).

By this configuration, the spin oscillation device 10 can be placed close to the recording magnetic pole 61 so that the radio-frequency magnetic field emitted from the spin oscillation device 10 can easily coincide with and overlap the recording magnetic field emitted from the recording magnetic pole 61. Furthermore, the device size of the spin oscillation device 10 can be configured relatively freely. That is, the spin oscillation device 10 can have a large size in the X direction, the Z direction, and the −Y direction in FIG. 12. Hence the size of the spin oscillation device 10 can be optimally designed in relation to the recording density.

According to this embodiment, particularly in the case where the three-dimensional size of the recording head is sufficiently larger than the spin oscillation device 10, a recording magnetic field Hw having sufficient strength and inclined at generally 45° (angle θ=45°) with respect to the magnetization M (Y direction) of the medium recording layer can be applied to the medium recording site, which is radio-frequency assisted by a pair of spin oscillation layers provided in the spin oscillation device 10. By suitably positioning the pair of spin oscillation layers of the spin oscillation device 10 with respect to the recording magnetic pole 61 and the auxiliary magnetic pole 62, Hw with θ=45° can be applied to the medium recording site. This enables highly efficient information recording as in the embodiments described above with reference to FIGS. 1 to 11.

Furthermore, in this embodiment, the medium travel direction 85 can be the Z direction instead of the X direction. Also in this case, the 45° oblique recording magnetic field produced from the recording magnetic pole 61 and the auxiliary magnetic pole 62 can be allowed to coincide with and to overlap the radio-frequency magnetic field emitted from the spin oscillation device 10, enabling a highly efficient write operation.

Next, a fourth embodiment of the invention is described.

Figure 13:
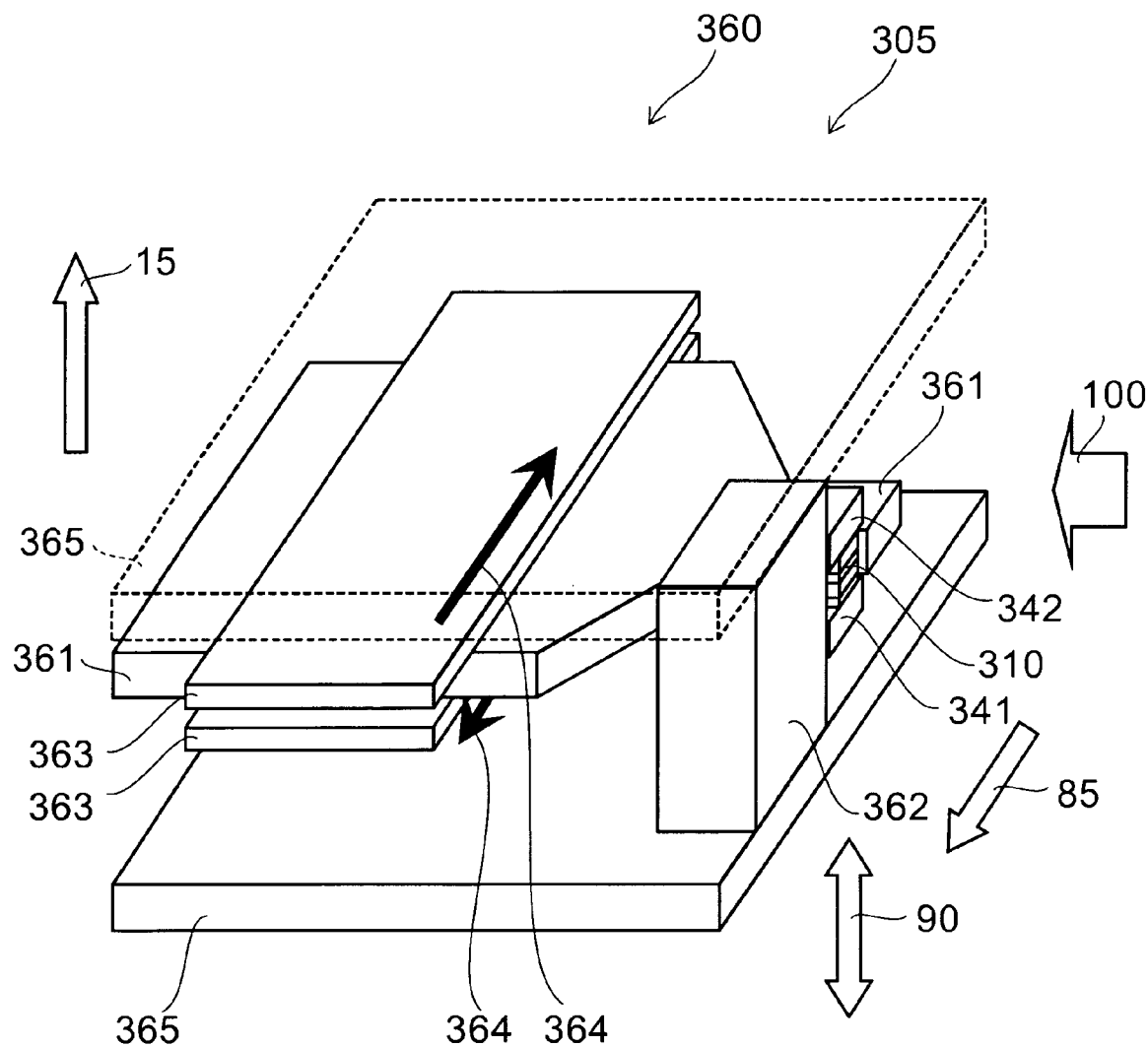
FIG. 13 is a perspective view showing the schematic configuration of a writing head section of a magnetic recording head according to a fourth embodiment of the invention.

FIG. 13 is a perspective view showing the schematic configuration of a writing head section of a magnetic recording head according to the fourth embodiment of the invention.

Figure 14:
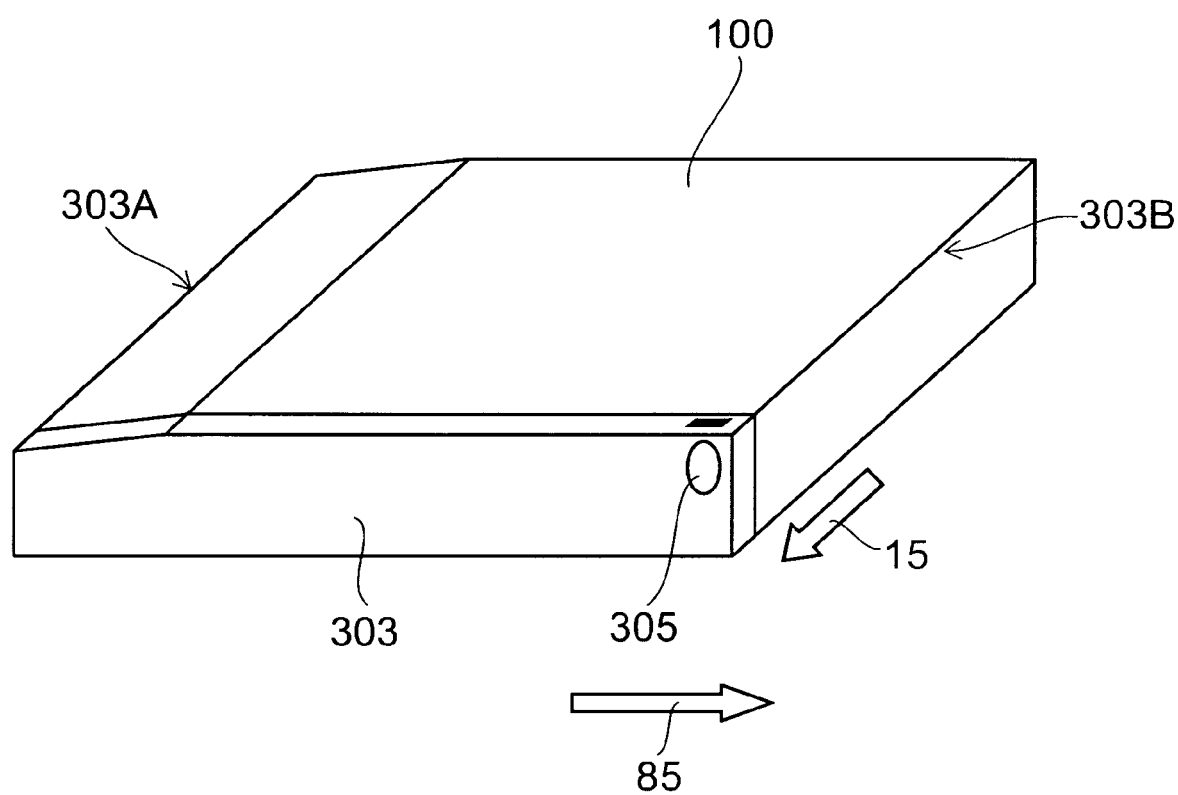
FIG. 14 is a perspective view showing a head slider on which this magnetic recording head is mounted.

FIG. 14 is a perspective view showing a head slider on which this magnetic recording head is mounted.

The magnetic recording head 305 of this embodiment comprises a writing head section 360 and a reproducing head section, which is not shown. The writing head section 360 comprises a main magnetic pole 361, a shield 362, excitation coils 363, a return yoke 365, a spin torque oscillator 310, and a pair of electrodes 341, 342. The main magnetic pole 361 generates a magnetic field upon passage of an excitation current 364 through a pair of excitation coils 363. The recording medium moves along the medium travel direction 85 directed from the main magnetic pole 361 to the shield 362. The track width 90 of the recording medium is parallel to the lamination direction 15 of the spin torque oscillator 310.

The components of the writing head section 360 are separated from each other by alumina or other insulators, not shown.

The magnetic recording head 305 is mounted on a head slider 303 as shown in FIG. 14. The head slider 303, illustratively made of $Al_2O_3$/TiC, is designed and worked so that it can move relative to a magnetic recording medium such as a magnetic disk while floating thereabove or being in contact therewith. The head slider 303 has an air inflow side 303A and an air outflow side 303B. The spin torque oscillator 310 is placed so that the lamination surface of the spin torque oscillator 310 faces the side surface of the head slider 303. Thus the direction from the main magnetic pole 361 to the spin torque oscillator 310 is set to the medium travel direction 85 to enable a stable write operation.

Figure 15:
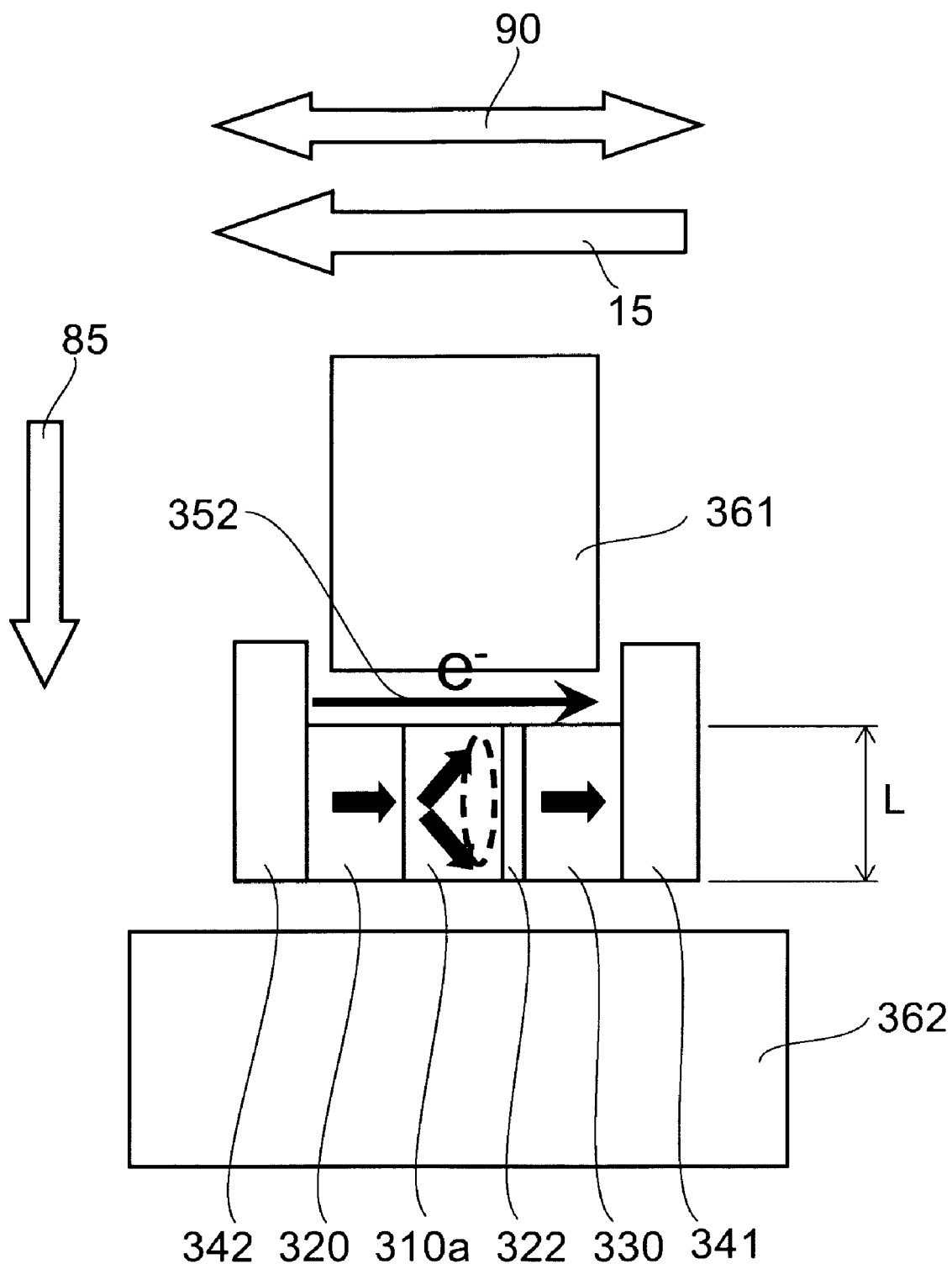
FIG. 15 is a schematic view of the spin torque oscillator as viewed from the medium facing surface.

FIG. 15 is a schematic view of the spin torque oscillator 310 provided in this magnetic recording head as viewed from the medium facing surface 100.

The spin torque oscillator 310 has a structure in which a first electrode 341, a spin injection layer 330 (second magnetic layer), an intermediate layer 322 having high spin transmissivity, an oscillation layer 310a (first magnetic layer), a bias layer 320, and a second electrode 342 are laminated in this order in a direction generally perpendicular to the medium travel direction 85. That is, in this structure, the layers of the spin torque oscillator 310 are laminated parallel to the track width direction 90. By passing a driving electron flow 352 from the electrode 342 to the electrode 341, a radio-frequency magnetic field can be generated from the oscillation layer 310a. The driving current density is preferably from $5\times10^7$ to $1\times10^9$ A/cm², and suitably adjusted so as to achieve a desired oscillation.

Here, a description is given of the relationship between the length L of the oscillation layer 310a along the medium travel direction 85 required for writing to the medium and the disk maximum travel velocity of the hard disk drive (HDD).

The magnetic recording head continuously records a recording pattern while moving at a given velocity relative to the magnetic recording medium. Here, the length L of the oscillation layer 310a required for magnetic recording depends on the disk maximum travel velocity. The rotation speed of an HDD is typically expressed in rpm (revolutions per minute). The maximum travel velocity for disk diameter D (inch) and rotation speed RPM (rpm) is given by formula (1):

$$\text{Disk maximum travel velocity (m/sec)} = (\text{RPM}/60) \times D \times \pi \times 0.0254 \quad (1)$$

FIG. 17 shows tables listing the disk maximum travel velocity and the length required for the oscillation layer 310a of HDDs in typical specifications.

FIG. 17A shows a table listing the disk maximum travel velocity for various combinations of disk size and disk rotation speed.

For a disk diameter of 2.5 inches and a disk rotation speed of 5400 rpm, the disk maximum travel velocity is 18.0 m/sec. For a disk diameter of 3.5 inches and a disk rotation speed of 10000 rpm, the disk maximum travel velocity is 46.5 m/sec.

On the other hand, if the application time of the assist magnetic field from the radio-frequency oscillation device decreases, the reversal probability of the medium decreases.

Figure 16:
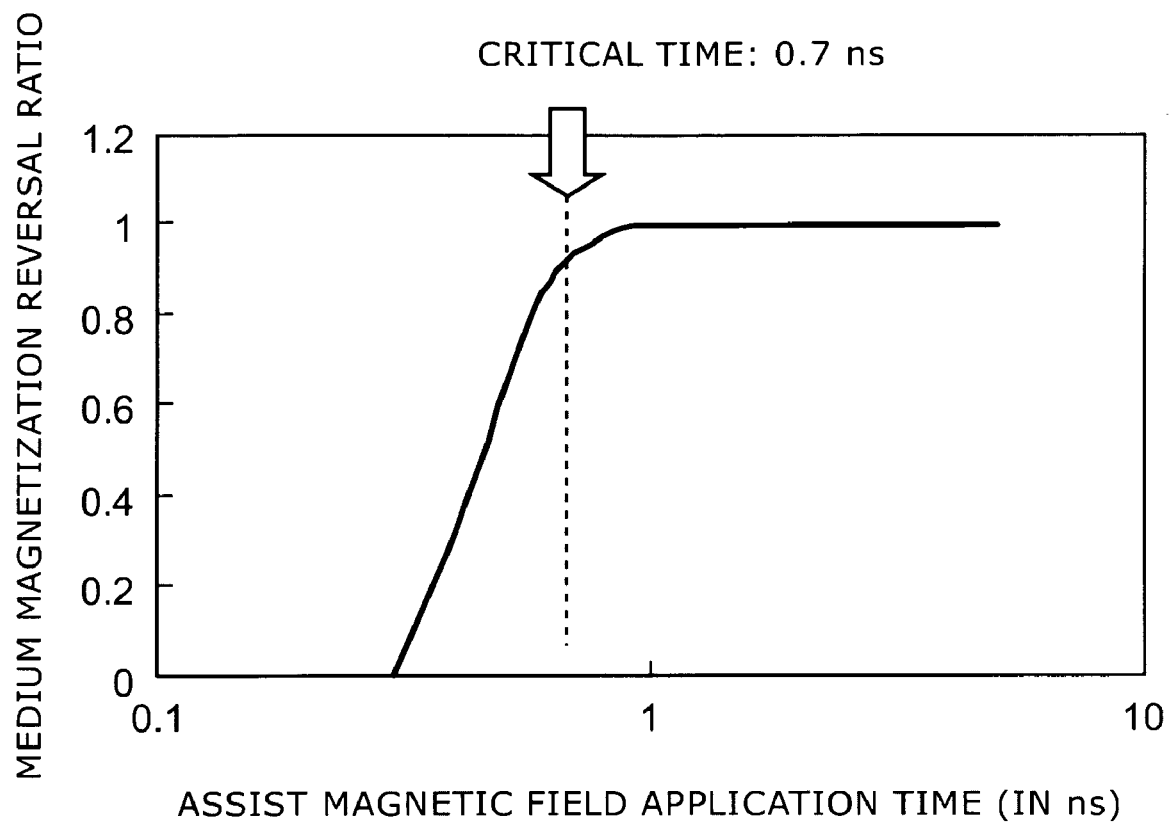
FIG. 16 is a graph showing the relationship between the medium magnetization reversal ratio and the assist magnetic field application time.

FIG. 16 is a graph showing the relationship between the medium magnetization reversal ratio and the assist magnetic field application time.

The graph shows a simulation result in the case where the anisotropic magnetic field of the recording medium is Hk=10500 Oe, the radio-frequency assist magnetic field is ±1000 Oe, the assist frequency is 10 GHz, and the write magnetic field is 5000 Oe. The reversal probability sharply decreases when the application time of the assist magnetic field is 0.7 nanoseconds or less. Hence, to ensure an application time of 0.7 nanoseconds or more at the disk maximum travel velocity of the HDD, the length L of the oscillation layer 310a in the medium travel direction 85 needs to be disk maximum travel velocity×0.7 nanoseconds or more. In sum, the following formula (2) is required:

$$\text{Oscillation layer length } L \text{ (nanometer)} \geq \text{RPM (rpm)} \times D \text{ (inch)} \times 0.00093 \quad (2)$$

The table of FIG. 17B lists the length L required for the oscillation layer 310a along the disk travel direction, or medium travel direction 85, for various combinations of disk size and disk rotation speed.

For a disk diameter of 2.5 inches and a disk rotation speed of 5400 rpm, the length of the oscillation layer 310a required in the disk travel direction is determined from formula (2) to be 12.6 nm. For a disk diameter of 3.5 inches and a disk rotation speed of 10000 rpm, the length required of the oscillation layer 310a is determined to be 32.6 nm.

In this embodiment, the length L of the oscillation layer 310a can be made sufficiently large because the spin torque oscillator 310 is laminated in the track width direction 90. Furthermore, the oscillation efficiency can be enhanced by decreasing the thickness of the oscillation layer 310a.

Figure 18:
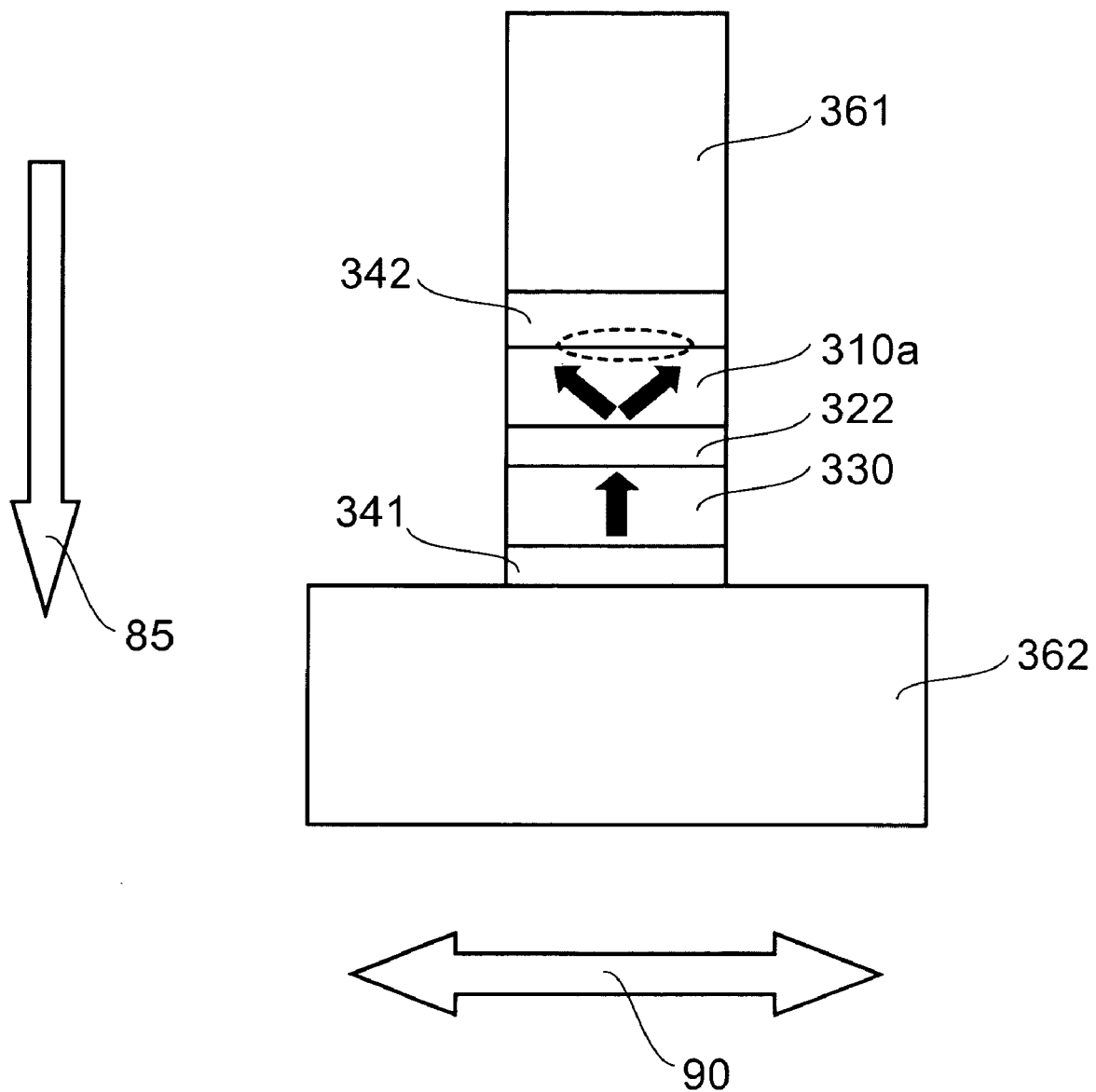
FIG. 18 is a schematic view of a spin torque oscillator of a comparative example as viewed from the medium facing surface.

FIG. 18 is a schematic view of a spin torque oscillator 310 according to a comparative example as viewed from the medium facing surface 100.

In conformity with the film formation direction of the main magnetic pole 361, an electrode 342, an oscillation layer 310a, an intermediate layer 322, a spin injection layer 330, and an electrode 341 are laminated along the medium travel direction 85. In this case, the driving electron flow 352 of the spin torque oscillator 310 needs to be passed perpendicularly into the boundary between the oscillation layer 310a and the spin injection layer 330. Furthermore, the thickness of the oscillation layer 310a is preferably 5 to 20 nm. A smaller thickness thereof results in increasing the oscillation efficiency to facilitate oscillation, but decreasing the length of the oscillation layer along the medium travel direction 85.

For a disk diameter of 2.5 inches and a disk rotation speed of 5400 rpm, the travel velocity of the medium is approximately 10 m/sec at the middle circumference of the HDD and 18 m/sec at the outer circumference. From FIG. 16, the critical time required for writing is approximately 0.7 nanometers. Hence the length required for the oscillation layer is 7 nm at the middle circumference, and 12.6 nm at the maximum.

Thus, in the structure of the comparative example where the layers of the spin torque oscillator 310 are laminated along the medium travel direction 85, if the thickness of the oscillation layer 310a is increased to the length required for writing, the allowable range of the desired thickness is restricted from the viewpoint of oscillation efficiency, and a sufficiently large thickness results in decreased oscillation efficiency. On the other hand, decreasing the thickness of the oscillation layer 310a to enhance the oscillation efficiency results in insufficient reversal ratio of the medium.

Hence the lamination direction 15 is preferably orthogonal to the medium travel direction 85.

The electrode 341 and the electrode 342 can be made of a material having low electrical resistance and being resistant to oxidation such as Ti and Cu.

The intermediate layer 322 can be made of a nonmagnetic material having high spin transmissivity such as Cu, Au, and Ag. The thickness of the intermediate layer 322 is preferably from one atomic layer to 3 nm. By providing the intermediate layer 322, exchange coupling between the oscillation layer 310a and the spin injection layer 330 can be reduced.

The oscillation layer 310a is made of a soft ferromagnetic material such as CoFe, CoNiFe, NiFe, CoZrNb, FeN, FeSi, and FeAlSi having relatively high saturation magnetic flux density and having magnetic anisotropy in a direction longitudinal to the film plane. The thickness of the oscillation layer 310a is preferably from 5 to 20 nm.

To impart orientation to the oscillation layer 310a, a bias layer 320 can be laminated adjacent to the oscillation layer 310a. The bias layer 320 is film-formed using an antiferromagnetic material such as FeMn, NiMn, FeNiMn, FeMnRh, RhMn, CoMn, CrMn, CrMnPt, CrMnRh, CrMnCu, CrMnPd, CrMnIr, CrMnNi, CrMnCo, CrMnTi, PtMn, PdMn, PdPtMn, and IrMn. Alternatively, the bias layer 320 can be made of a hard magnetic material having good perpendicular orientation such as a CoCrPt, CoCrTa, CoCrTaPt, CoCrTaNb, and other CoCr-based magnetic layer, a CoPt-based or FePt-based alloy magnetic layer, or a SmCo-based alloy magnetic layer.

Here, a foundation layer can be used so that the magnetization of the magnetic layer is directed perpendicular or parallel to the film plane. For example, a magnetization direction parallel to the plane can be obtained by using a nonmagnetic transition metal such as Cr, Ta, Ti, and W, or an alloy thereof, or a laminated film thereof. The bias layer 320 can be ferromagnetically coupled to the oscillation layer 310a made of a soft ferromagnetic material so that the oscillation layer 310a consists of a single domain, enabling stable oscillation. In FIG. 15, the bias layer 320 is fabricated from a hard magnetic material and ferromagnetically coupled to the oscillation layer 310a. In the case of using such a bias layer, it is assumed herein that the coercivity of the oscillation layer also includes the effective magnetic field imparted from the bias layer.

The spin injection layer 330 is film-formed using a hard magnetic material such as CoPt. The thickness of the spin injection layer 330 is preferably from 2 to 60 nm. The spin injection layer 330 can be a soft magnetic layer of CoFe, CoNiFe, NiFe, CoZrNb, FeN, FeSi, or FeAlSi having relatively high saturation magnetic flux density and having magnetic anisotropy in a direction longitudinal to the film plane, or a CoCr-based magnetic alloy film with its magnetization oriented in a direction longitudinal to the film plane. It is also possible to suitably use a material layer having good perpendicular orientation such as a CoCrPt, CoCrTa, CoCrTaPt, CoCrTaNb, and other CoCr-based magnetic layer, a TbFeCo or other RE-TM amorphous alloy magnetic layer, a Co/Pd, Co/Pt, CoCrTa/Pd, or other Co artificial lattice magnetic layer, a CoPt-based or FePt-based alloy magnetic layer, or a SmCo-based alloy magnetic layer, with the magnetization oriented perpendicular to the film plane. It is also possible to laminate more than one of the above materials. This is intended for adjusting the saturation magnetic flux density (Bs) and the anisotropic magnetic field (Hk) of the spin injection layer.

Here, the idea of adjusting the anisotropic magnetic field or the coercivity is similar to that for the above-described bias layer located adjacent to the oscillation layer. For distinction from the bias layer, the layer adjacent to the intermediate layer is referred to as the spin injection layer, and the other layer is referred to as the bias layer as needed. It is also assumed that the coercivity or the anisotropic magnetic field of the spin injection layer includes the effective magnetic field imparted to the spin injection layer. The bias layer 320 can also be film-formed using an antiferromagnetic material such as FeMn, NiMn, FeNiMn, FeMnRh, RhMn, CoMn, CrMn, CrMnPt, CrMnRh, CrMnCu, CrMnPd, CrMnIr, CrMnNi, CrMnCo, CrMnTi, PtMn, PdMn, PdPtMn, and IrMn. The oscillation layer can also be made of a hard magnetic material like the spin injection layer. For stable oscillation, the coercivity is adjusted so as to be higher in the spin injection layer than in the oscillation layer.

Furthermore, the oscillation layer or the spin injection layer can be configured as a laminated ferri structure in which a ferromagnetic layer, a nonmagnetic layer, and a ferromagnetic layer are laminated, or a structure in which a laminated ferri structure and an antiferromagnetic layer are laminated. In this case, the ferromagnetic material can be any of those described above, the nonmagnetic layer is preferably made of a noble metal such as Cu, Pt, Au, Ag, Pd, and Ru, or can be made of a nonmagnetic transition metal such as Cr, Rh, Mo, and W, and the antiferromagnetic material can be any of those described above.

Moreover, a hard bias layer made of a hard magnetic material can be provided on the bottom of the electrode 341 and the top of the electrode 342. The magnetic field applied by the hard bias layer can be directed along the magnetization easy axis of the oscillation layer to further stabilize oscillation.

In this embodiment, the spin torque oscillator 310 is placed between the main magnetic pole 361 and the shield 362. In this configuration, a recording pattern is formed on the medium in the region where the recording magnetic field from the main magnetic pole 361 overlaps the radio-frequency magnetic field from the spin torque oscillator 310. Furthermore, because the magnetization easy axis of the spin injection layer 330 and the oscillation layer 310a is oriented perpendicular to the film plane, stable oscillation is achieved.

FIGS. 19 and 20 are schematic views for illustrating the relationship of the stability of oscillation characteristics to the direction of the magnetization easy axis of the spin injection layer 330 and the oscillation layer 310a with respect to the magnetic field 611 from the main magnetic pole 361.

Figure 19A:
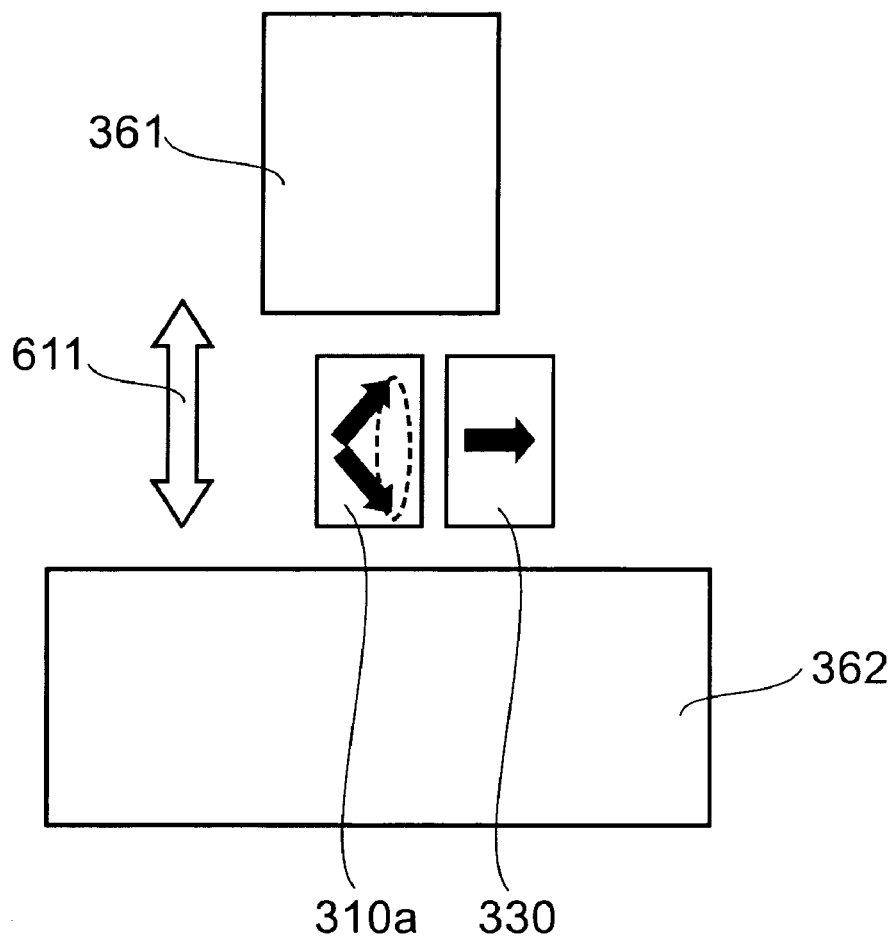
FIGS. 19A and 19B are schematic views for illustrating the relationship of the stability of oscillation characteristics to the direction of the magnetization.
Figure 19B:
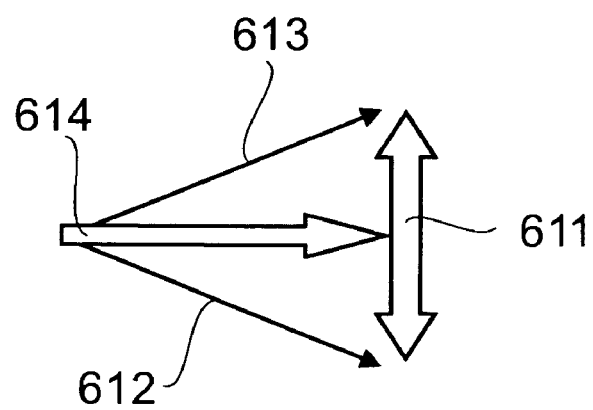

FIG. 19A shows the case where the magnetization easy axis of the spin injection layer 330 and the oscillation layer 310a is directed perpendicular to the film plane of the laminated films. Reversal of the magnetic field 611 from the main magnetic pole causes an inclination of the magnetization direction of the spin injection layer 330, which is perpendicular to the direction of the magnetic field 611. As shown in FIG. 19B, the effective magnetic field in the spin injection layer 330 under a magnetic field directed from the main magnetic pole 361 to the shield 362 is indicated by the arrow 612, and the effective magnetic field in the spin injection layer 330 under a magnetic field directed from the shield 362 to the main magnetic pole 361 is indicated by the arrow 613. Even if the magnetic field 611 from the main magnetic pole 361 is reversed, the effective magnetic field in the spin injection layer 330 remains unchanged in magnitude despite its change in direction. Hence the effective magnetic field in the oscillation layer 310a exhibiting an anisotropic magnetic field 614 does not vary, achieving stable oscillation.

Figure 20A:
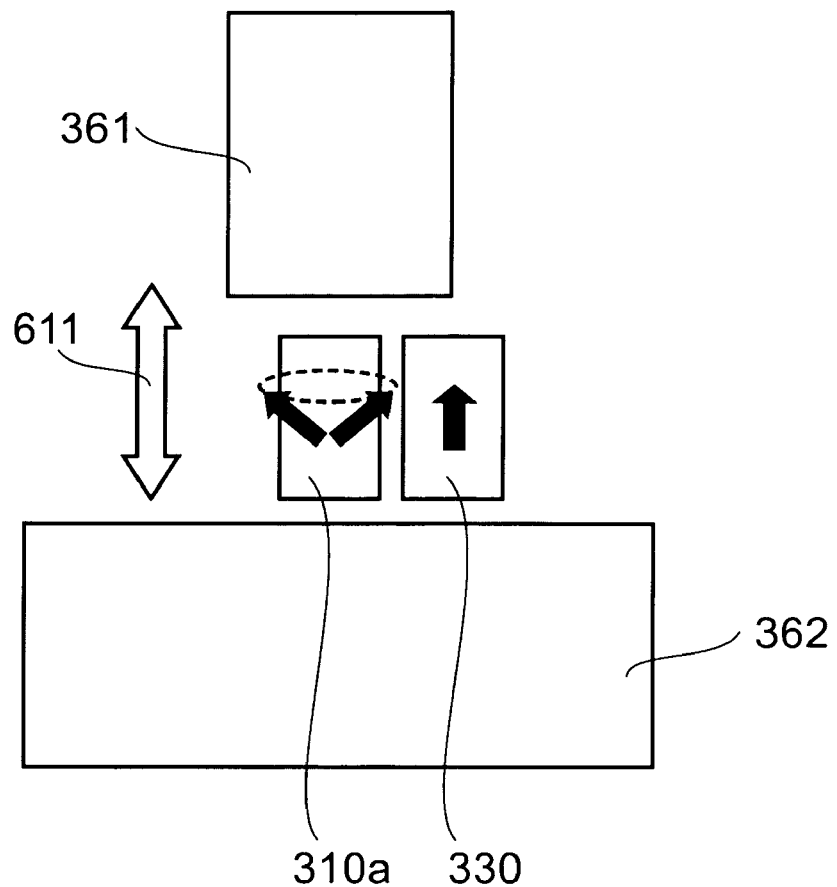
FIGS. 20A and 20B are schematic views for illustrating the relationship of the stability of oscillation characteristics to the direction of the magnetization.
Figure 20B:
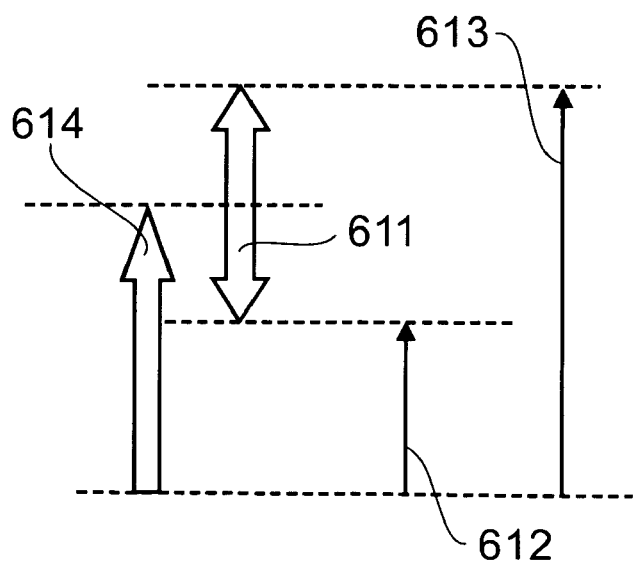

FIG. 20A shows the case where the magnetization easy axis of the spin injection layer 330 and the oscillation layer 310a is directed parallel to the film plane of the laminated films and also parallel to the medium travel direction 85, not shown. In this case, for a high magnetic field from the main magnetic pole 361, upon its reversal, the effective magnetic field in the spin injection layer 330 remains unchanged in direction, but changes its magnitude. More specifically, as shown in FIG. 20B, upon reversal of the magnetic field 611 from the main magnetic pole 361, the effective magnetic field 612 in the spin injection layer 330 under a magnetic field directed from the main magnetic pole 361 to the shield 362 varies in magnitude from the effective magnetic field 613 in the spin injection layer 330 under a magnetic field directed from the shield 362 to the main magnetic pole 361. Hence the effective magnetic field in the oscillation layer 310a varies in magnitude, varying the oscillation frequency.

In this embodiment, the magnetization easy axis of the layers of the laminated body is perpendicular to the film plane. Hence a spin torque oscillator 310 having a stable oscillation frequency is realized.

Next, a fifth embodiment of the invention is described.

Figure 21:
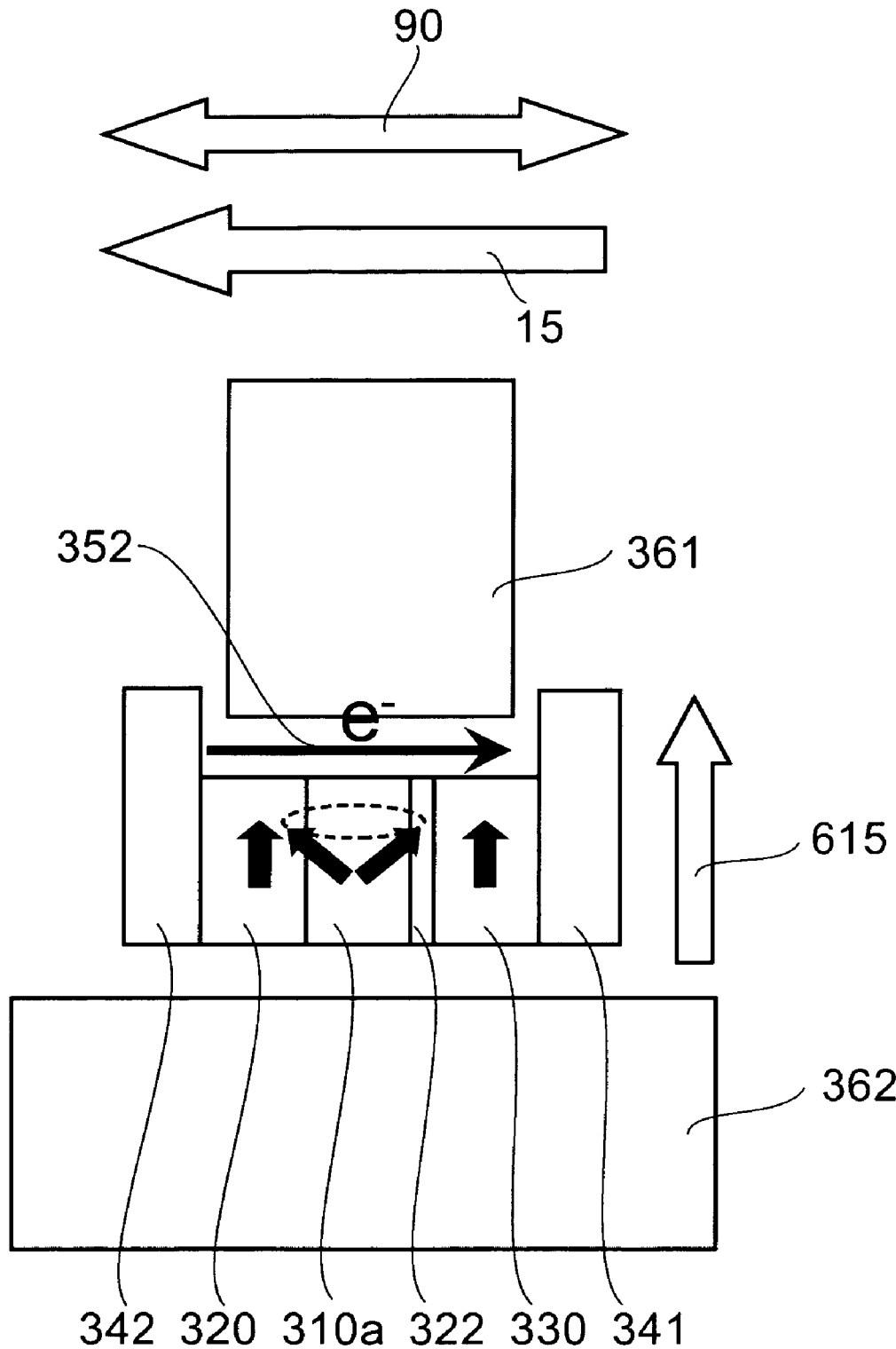
FIG. 21 is a schematic view of a spin torque oscillator according to a fifth embodiment of the invention as viewed from the medium facing surface.

FIG. 21 is a schematic view of a spin torque oscillator 310 according to the fifth embodiment of the invention as viewed from the medium facing surface 100.

The spin torque oscillator 310 has a structure in which a first electrode 341, a spin injection layer 330, an intermediate layer 322 having high spin transmissivity, an oscillation layer 310a, a bias layer 320, and a second electrode 342 are laminated in this order in the direction parallel to the track width direction 90. The figure shows the case where the direction 615 of the magnetic field from the main magnetic pole is from the shield 362 to the main magnetic pole 361.

The magnetization easy axis of the spin injection layer 330 and the oscillation layer 310a is directed parallel to the film plane of the laminated films and also parallel to the medium travel direction 85, not shown. In this case, the magnetic field from the main magnetic pole 361 is parallel to the anisotropic magnetic field of the laminated layers. Hence, reversal of the magnetic field from the main magnetic pole 361 causes variation of the effective magnetic field in the oscillation layer 310a, varying the oscillation frequency. To prevent this, the magnetic field applied from the main magnetic pole 361 to the spin torque oscillator 310, the coercivity of the spin injection layer 330, and the coercivity of the oscillation layer 310a are configured to decrease in this order. By this configuration, the magnetization direction of the spin torque oscillator 310 can be kept unchanged even upon reversal of the magnetic field from the main magnetic pole 361, and the effective magnetic field in the oscillation layer 310a can be kept constant in magnitude. Consequently, a spin torque oscillator 310 capable of stable operation can be realized.

Next, a variation of the fifth embodiment is described.

Figure 22:
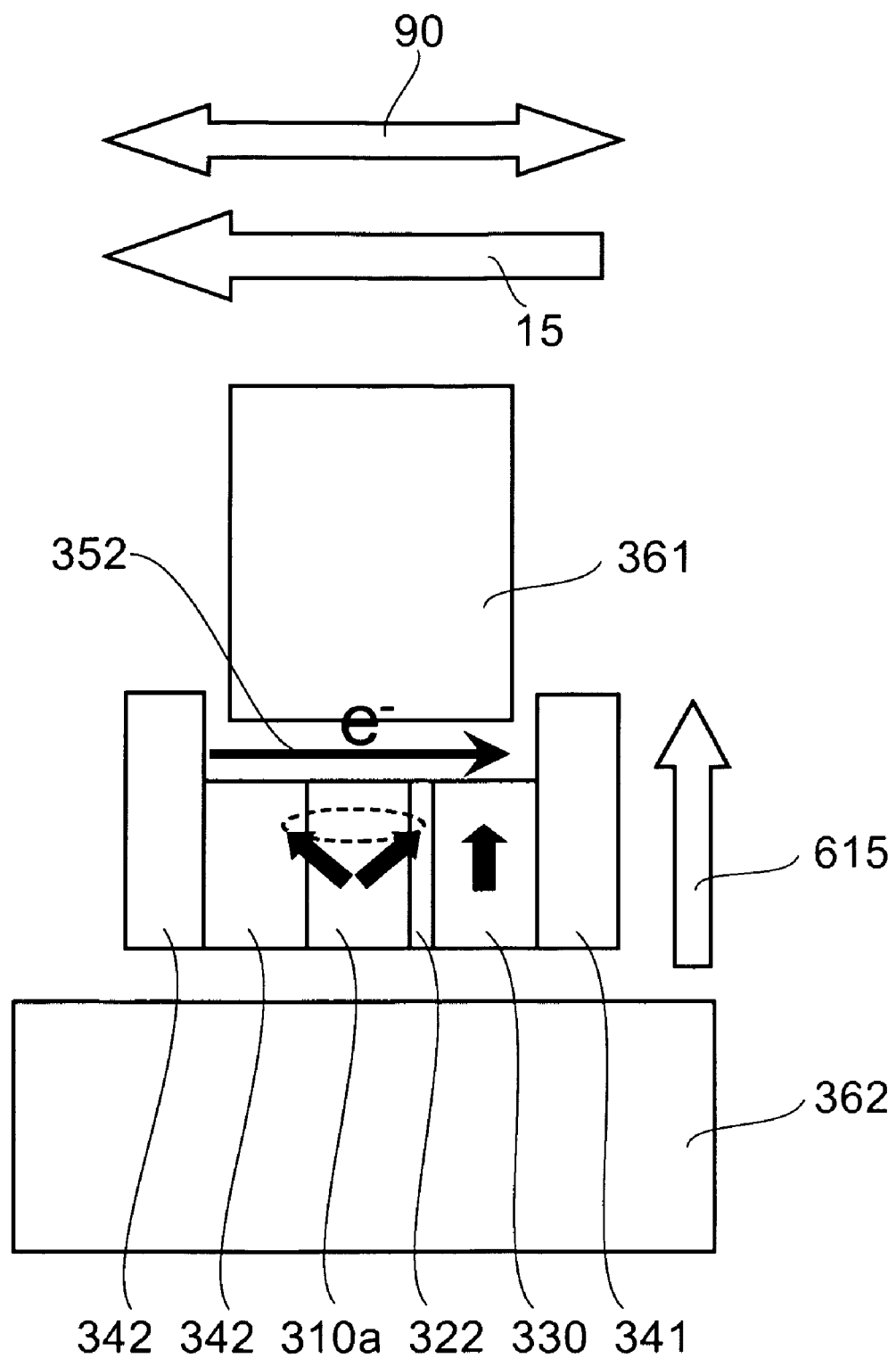
FIG. 22 is a schematic view of a spin torque oscillator of a variation of the fifth embodiment as viewed from the medium facing surface.

FIG. 22 is a schematic view of a spin torque oscillator 310 of this variation as viewed from the medium facing surface 100.

The spin torque oscillator 310 has a structure in which a first electrode 341, a spin injection layer 330, an intermediate layer 322 having high spin transmissivity, an oscillation layer 310a, and a second electrode 342 are laminated in this order in the direction parallel to the track width direction 90.

If the magnetic field from the main magnetic pole 361 is high, the oscillation layer 310a consists of a single domain in combination with the bias layer 320. Hence the spin torque oscillator 310 operates stably without the bias layer 320.

Next, a sixth embodiment of the invention is described.

Figure 23:
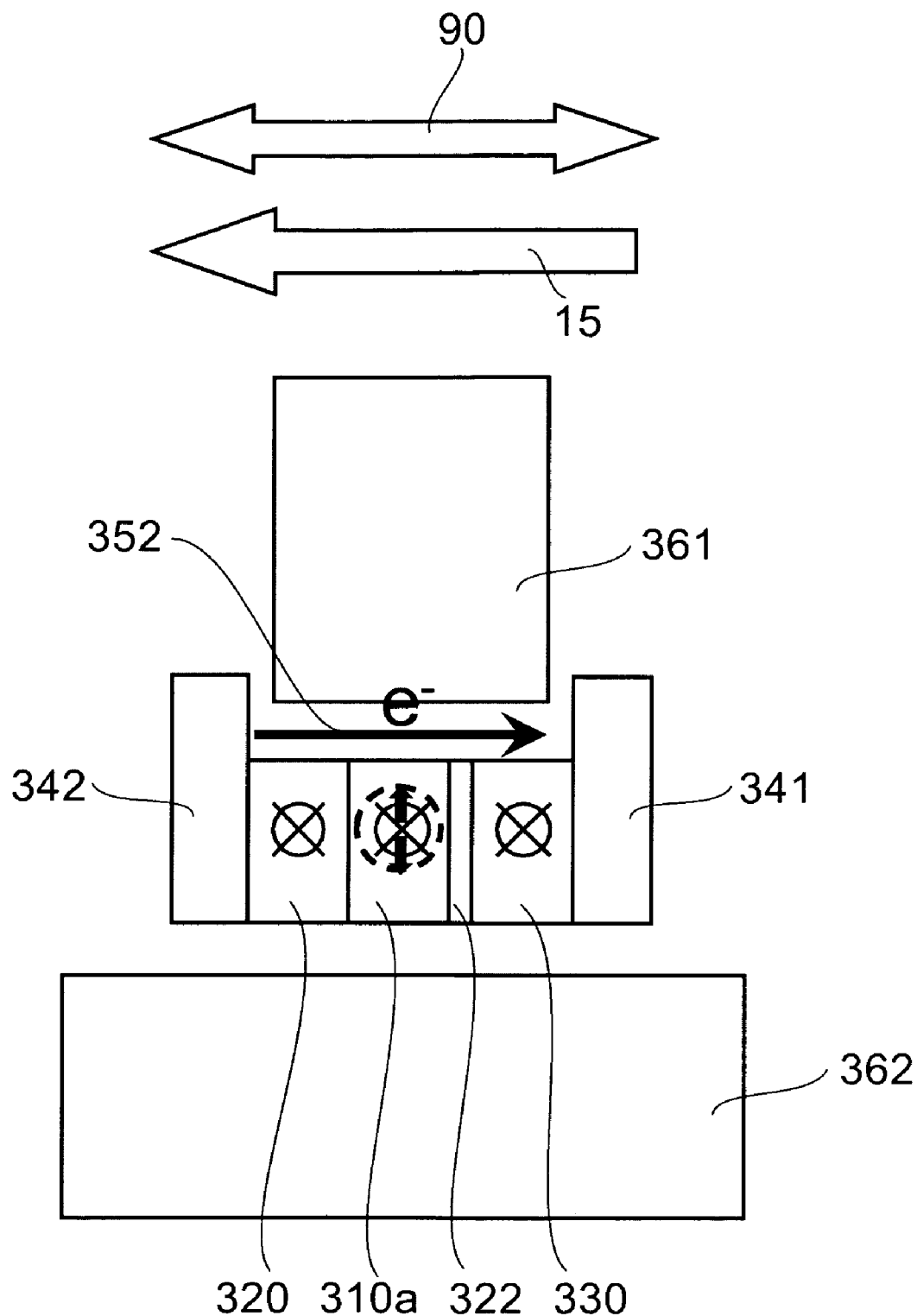
FIG. 23 is a schematic view of a spin torque oscillator according to a sixth embodiment of the invention as viewed from the medium facing surface.

FIG. 23 is a schematic view of a spin torque oscillator 310 according to the sixth embodiment of the invention as viewed from the medium facing surface 100.

The spin torque oscillator 310 has a structure in which a first electrode 341, a spin injection layer 330, an intermediate layer 322 having high spin transmissivity, an oscillation layer 310a, a bias layer 320, and a second electrode 342 are laminated in this order in the direction parallel to the track width direction 90.

The magnetization direction of the spin injection layer 330 and the oscillation layer 310a is parallel to the film plane of the laminated films and perpendicular to the medium facing surface 100. In this case, reversal of the magnetic field from the main magnetic pole 361 does not cause reversal of the magnetization of the spin torque oscillator 310, and the effective magnetic field in the oscillation layer 310a remains constant in magnitude. Consequently, a spin torque oscillator 310 capable of stable operation can be realized.

Next, a seventh embodiment of the invention is described.

Figure 24:
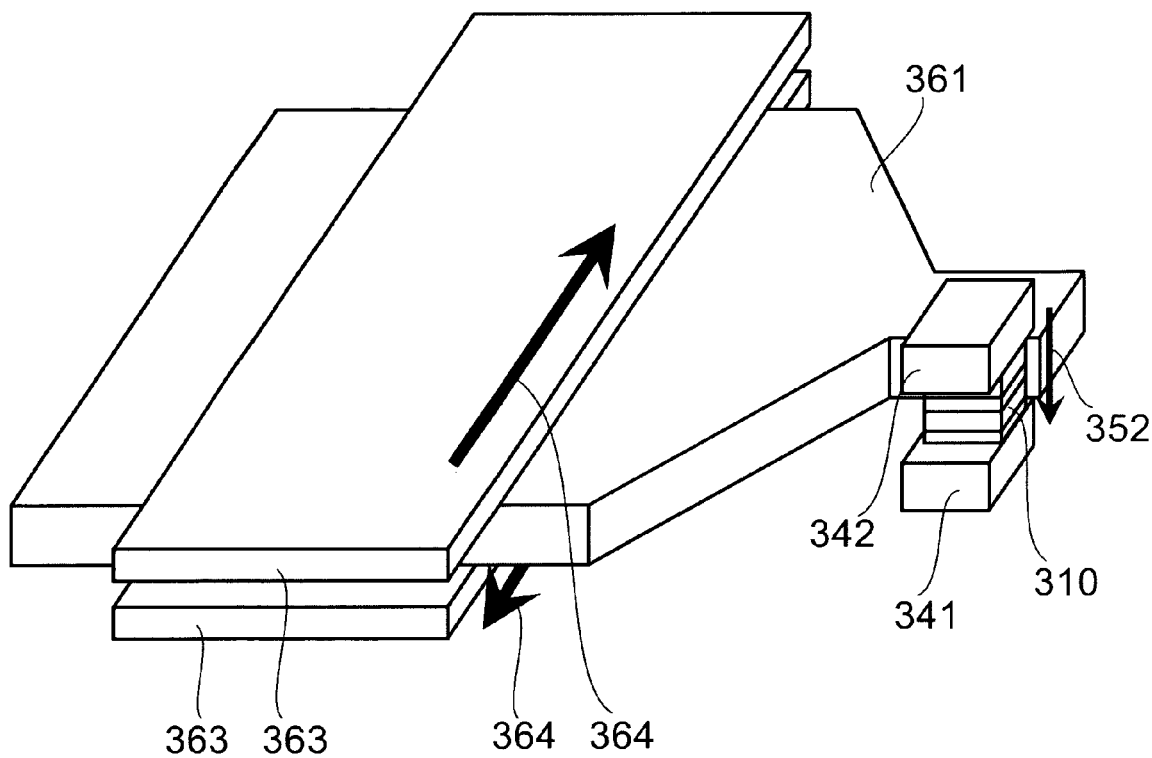
FIG. 24 is a perspective view showing the schematic configuration of a writing head section of a magnetic recording head according to a seventh embodiment of the invention.

FIG. 24 is a perspective view showing the schematic configuration of a writing head section of a magnetic recording head according to the seventh embodiment of the invention.

In the fourth to sixth embodiment of the invention, an oblique magnetic field is generated by using a shield 362 to facilitate the magnetization of the medium. On the other hand, in the case where the shield 362 is not provided, the magnetic field applied from the main magnetic pole 361 to the spin torque oscillator 310 is reduced, and the magnetization of the bias layer 320 is stabilized, thereby decreasing the disturbance in oscillation frequency.

In the configuration of this embodiment, the shield 362 is omitted from the writing head section of the magnetic recording head of the fourth embodiment. That is, a monopole magnetic recording head is combined with a spin torque oscillator 310.

According to this embodiment, the magnetic field applied from the main magnetic pole 361 to the spin torque oscillator 310 is reduced, and the magnetization of the bias layer 320 is stabilized. Thus a magnetic recording head with little disturbance in oscillation frequency can be realized.

In the fourth to seventh embodiment of the invention, the lamination direction 15 of the layers of the spin torque oscillator 310 is parallel to the track width direction 90. Hence the thickness of the oscillation layer 310a can be decreased to enhance the oscillation efficiency, and the length of the oscillation layer 310a along the medium travel direction 85 can be increased to ensure a sufficiently long writing time. Thus the writing width on the medium decreases because of the small thickness of the oscillation layer 310a. Consequently, the width of the main magnetic pole 361 can be set larger than the thickness of the oscillation layer 310a as viewed from the medium facing surface 100. In this case, the writing width in the track direction is almost determined by the area of the radio-frequency magnetic field generated from the oscillation layer 310a, and hence the thickness of the oscillation layer 310a is made equal to the track width. Thus the width of the main magnetic pole 361 can be increased independent of the track width of the medium.

In the embodiments of the invention, the thickness of the oscillation layer 310a is approximately 20 nm, and thus the track width of the write pattern is approximately 20 nm. Hence the magnetic recording head according to the embodiments of the invention is applicable to a hard disk having very high track density. There may be some difficulty in its application to a hard disk with low track density having a track width of approximately 150 nm. However, in the case of a medium in which adjacent tracks are exchange-decoupled such as a discrete medium or a discrete bit medium, reversal of part of a track causes reversal of the entire track, and hence the restriction on track density is eliminated. Consequently, it is possible to realize a radio-frequency magnetic field assisted recording head which is free from restriction on track density and adaptable to a wide range of hard disk specifications.

Next, a magnetic recording apparatus according to an embodiment of the invention is described. More specifically, the magnetic recording head 5, 305 of the invention described with reference to FIGS. 1 to 24 is illustratively incorporated in an integrated recording-reproducing magnetic head assembly, which can be installed on a magnetic recording/reproducing apparatus.

Figure 25:
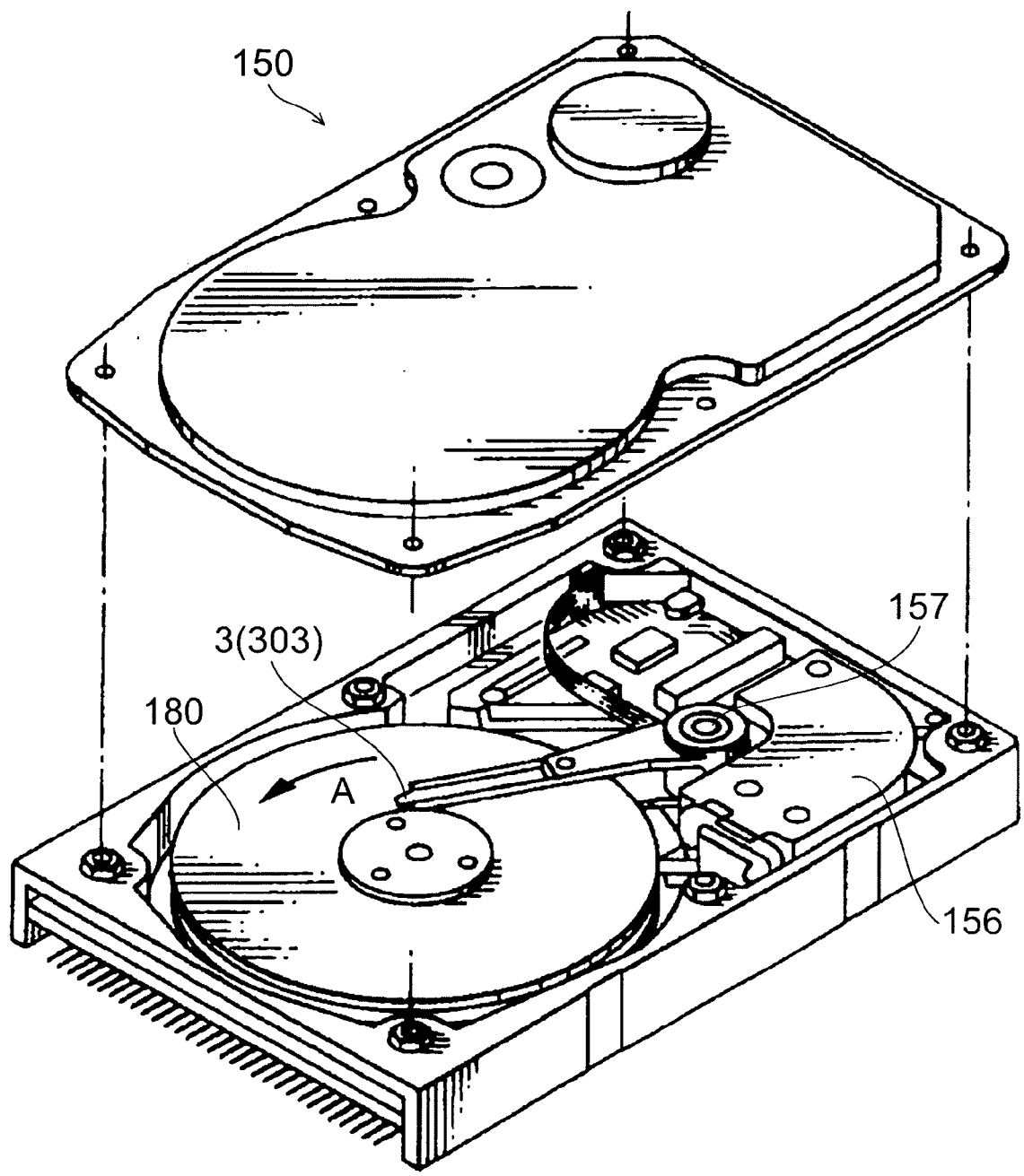
FIG. 25 is a principal perspective view illustrating the schematic configuration of a magnetic recording/reproducing apparatus.

FIG. 25 is a principal perspective view illustrating the schematic configuration of such a magnetic recording/reproducing apparatus.

More specifically, the magnetic recording/reproducing apparatus 150 of the invention is an apparatus based on a rotary actuator. In this figure, a recording medium disk 180 is mounted on a spindle 152 and rotated in the direction of arrow A by a motor, not shown, in response to a control signal from a drive controller, not shown. The magnetic recording/reproducing apparatus 150 of the invention may include a plurality of medium disks 180.

A head slider 3, 303 for recording/reproducing information stored on the medium disk 180 has a configuration as described above with reference to FIGS. 2 and 14 and is attached to the tip of a thin-film suspension 154. Here, the magnetic recording head according to any one of the above embodiments is illustratively installed near the tip of the head slider 3, 303.

When the medium disk 180 is rotated, the medium facing surface (air bearing surface, ABS) 100 of the head slider 3, 303 is held at a prescribed floating amount from the surface of the medium disk 180. Alternatively, it is also possible to use a slider of the so-called "contact-traveling type", where the slider is in contact with the medium disk 180.

The suspension 154 is connected to one end of an actuator arm 155 including a bobbin for holding a driving coil, not shown. A voice coil motor 156, which is a kind of linear motor, is provided on the other end of the actuator arm 155. The voice coil motor 156 is composed of the driving coil, not shown, wound up around the bobbin of the actuator arm 155, and a magnetic circuit including a permanent magnet and an opposed yoke placed so as to sandwich the coil therebetween.

The actuator arm 155 is held by ball bearings, not shown, provided at two positions above and below the spindle 157, and can be slidably rotated by the voice coil motor 156.

Figure 26:
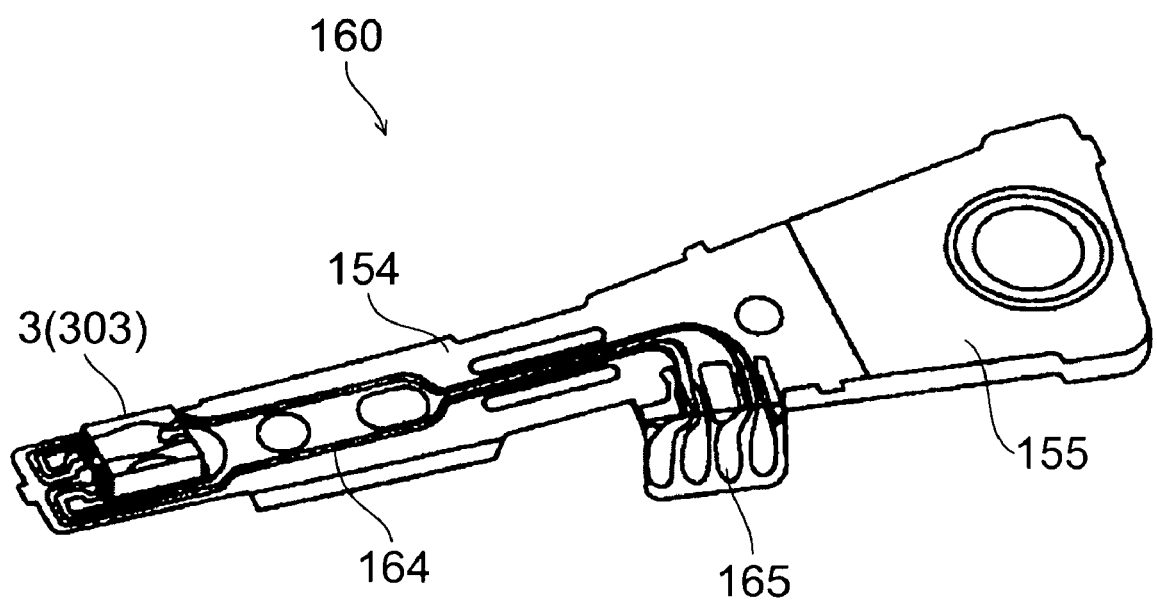
FIG. 26 is an enlarged perspective view of the magnetic head assembly ahead of the actuator arm as viewed from the disk side.

FIG. 26 is an enlarged perspective view of the magnetic head assembly 160 ahead of the actuator arm 155 as viewed from the disk side. More specifically, the magnetic head assembly 160 has an actuator arm 155 illustratively including a bobbin for holding a driving coil, and a suspension 154 is connected to one end of the actuator arm 155.

To the tip of the suspension 154 is attached a head slider 3, 303 including any one of the magnetic recording heads 5, 305 described above with reference to FIGS. 1 to 24. The suspension 154 has a lead 164 for writing and reading signals. The lead 164 is electrically connected to each electrode of the magnetic head incorporated in the head slider 3, 303. In the figure, the reference numeral 165 denotes an electrode pad of the magnetic head assembly 160.

According to the invention, by using the magnetic recording head as described above with reference to FIGS. 1 to 24, it is possible to reliably record information on the perpendicular magnetic recording medium disk 180 with higher recording density than conventional. Preferably, for efficient radio-frequency assisted recording, the resonance frequency of the medium disk 180 used is set nearly equal to the oscillation frequency of the spin oscillator 10.

FIG. 27 is a schematic view illustrating a magnetic recording medium that can be used in this embodiment.

More specifically, the magnetic recording medium 1 of this embodiment includes perpendicularly oriented, multiparticle magnetic discrete tracks 86 separated from each other by a nonmagnetic material (or air) 87. When this medium 1 is rotated by a spindle motor 4 and moved toward the medium travel direction 85, a recording magnetization 84 can be produced by the magnetic recording head 5, 305 described above with reference to FIGS. 1 to 24.

By setting the width (TS) of the spin torque oscillator 10 in the width direction of the recording track to not less than the width (TW) of the recording track 86 and not more than the recording track pitch (TP), it is possible to significantly prevent the decrease of coercivity in adjacent recording tracks due to leakage radio-frequency magnetic field generated from the spin torque oscillator 10. Hence, in the magnetic recording medium 1 of this example, only the target recording track 86 can be effectively subjected to radio-frequency magnetic field assisted recording.

According to this embodiment, a radio-frequency assisted recording apparatus with narrow tracks, i.e., high track density, is realized more easily than in the case of using a multi-particle perpendicular medium made of a so-called "blanket film". Furthermore, by using radio-frequency magnetic field assisted recording in conjunction with a magnetic medium material having high magnetic anisotropy energy (Ku) such as FePt and SmCo, which does not allow writing by conventional magnetic recording heads, magnetic medium particles (recording magnetic grain) can be further downscaled to the size of nanometers. Thus it is possible to realize a magnetic recording apparatus having far higher linear recording density than conventional also in the recording track direction (bit direction).

Figure 28:
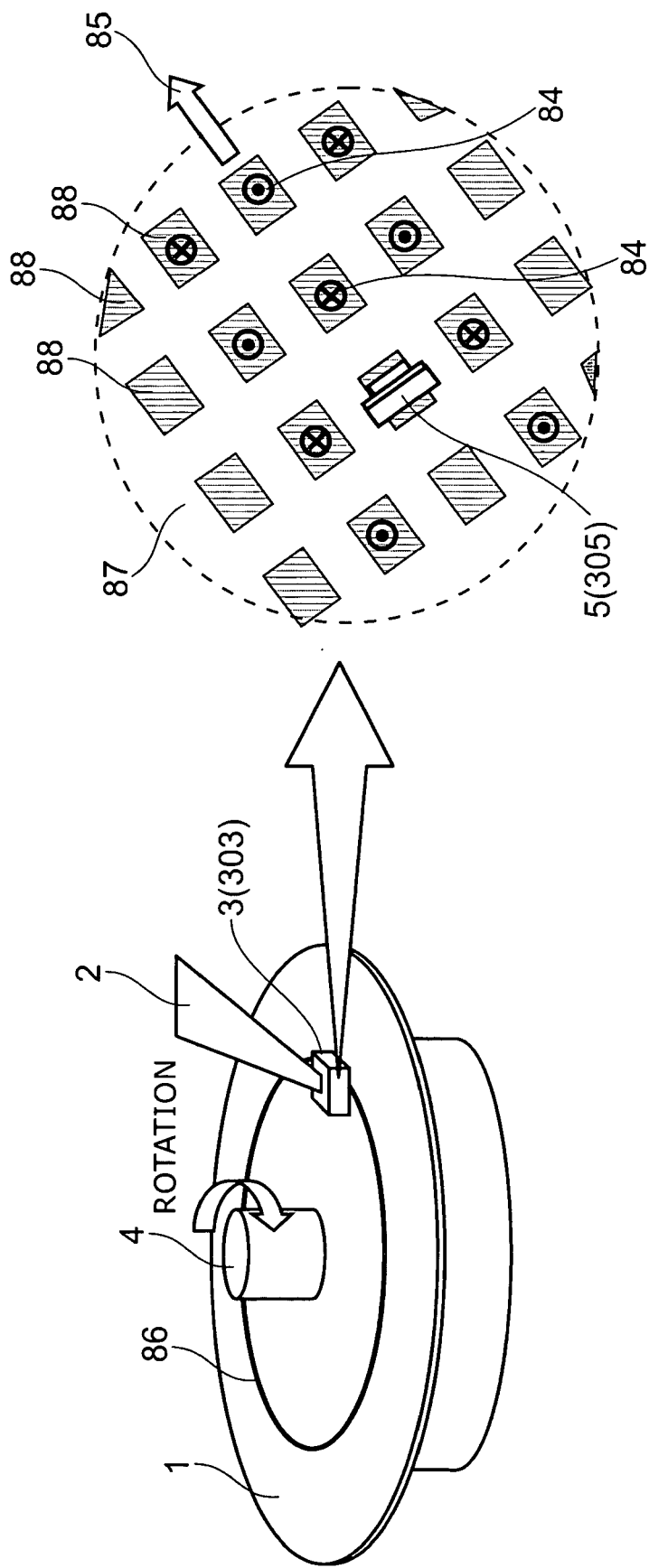
FIG. 28 is a schematic view illustrating another magnetic recording medium that can be used in this embodiment.

FIG. 28 is a schematic view illustrating another magnetic recording medium that can be used in this embodiment.

More specifically, the magnetic recording medium 1 of this example includes magnetic discrete bits (recording magnetic dots) 88 separated from each other by a nonmagnetic material 87. When this medium 1 is rotated by a spindle motor 4 and moved toward the medium travel direction 85, a recording magnetization 84 can be produced by the magnetic recording head 5, 305 described above with reference to FIGS. 1 to 24.

According to the invention, as shown in FIGS. 27 and 28, recording can be reliably performed also on the recording layer having high coercivity in a discrete-type magnetic recording medium 1, allowing magnetic recording with high density and high speed.

Also in this example, by setting the width (TS) of the spin torque oscillator 10 in the width direction of the recording track to not less than the width (TW) of the recording track 86 and not more than the recording track pitch (TP), it is possible to significantly prevent the decrease of coercivity in adjacent recording tracks due to leakage radio-frequency magnetic field generated from the spin torque oscillator 10. Hence only the target recording track 86 can be effectively subjected to radio-frequency magnetic field assisted recording. According to this example, by downscaling the magnetic discrete bit 88 and increasing its magnetic anisotropy energy (Ku), there is a possibility of realizing a radio-frequency magnetic field assisted recording apparatus having a recording density of 10 Tbits/inch$^2$ or more as long as thermal fluctuation resistance under the operating environment can be maintained.

The head according to the invention can be used in conjunction with removable media as well as the conventional HDD with fixed media.

The embodiments of the invention have been described with reference to the examples. However, the invention is not limited to the above examples. For instance, two or more of the examples described above with reference to FIGS. 1 to 24 can be combined as long as technically feasible, and such combinations are also encompassed within the scope of the invention.

That is, the invention is not limited to the examples, but can be practiced in various modifications without departing from the spirit thereof, and such modifications are all encompassed within the scope of the invention.

The invention claimed is:

1. A magnetic recording head comprising:
   a recording magnetic pole;
   an auxiliary magnetic pole juxtaposed with the recording magnetic pole; and
   a spin oscillation device provided between the recording magnetic pole and the auxiliary magnetic pole, the spin oscillation device including a first magnetic layer having at least one magnetic material layer, a second magnetic layer having at least one magnetic material layer, and a first nonmagnetic layer provided between the first magnetic layer and the second magnetic layer,
   the first magnetic layer and the second magnetic layer being antiferromagnetically coupled and/or magneto-statically coupled to each other, and
   the first magnetic layer and the second magnetic layer being laminated in a direction generally perpendicular to a direction from the recording magnetic pole to the auxiliary magnetic pole.

2. The head according to claim 1, wherein the spin oscillation device further includes:
   a third magnetic layer including a ferromagnetic material with a fixed magnetization direction; and
   a pair of electrodes operable to pass a current through a laminated body including the first and second magnetic layer, the nonmagnetic layer, and the third magnetic layer.

3. The head according to claim 2, wherein the current flowing through the laminated body flows generally parallel to a side surface of the recording magnetic pole which is parallel to the laminating direction.

4. The head according to claim 1, wherein
   the auxiliary magnetic pole includes a tip extending to a surface facing a recording medium to which a magnetic field from the recording magnetic pole is applied.

5. The head according to claim 1, wherein a side surface of the recording magnetic pole is generally perpendicular to a longitudinal direction of a recording track formed in a magnetic recording medium to which a magnetic field from the recording magnetic pole is applied.

6. The head according to claim 5, wherein the spin oscillation device is provided on a trailing side of the recording magnetic pole.

7. The head according to claim 5, wherein the spin oscillation device is provided on a leading side of the recording magnetic pole.

8. The head according to claim 1, wherein a side surface of the recording magnetic pole, which is parallel to the laminating direction, is generally parallel to a longitudinal direction of a recording track formed in a magnetic recording medium to which a magnetic field from the recording magnetic pole is applied.

9. The head according to claim 1, wherein a region in a magnetic recording medium to which a recording magnetic field produced by the recording magnetic pole and inclined generally at 45° to a medium facing surface is applied generally corresponds to a region in the magnetic recording medium to which a radio-frequency magnetic field produced by the spin oscillation device is applied.

10. The head according to claim 1, wherein the auxiliary magnetic pole passes above a portion of a magnetic recording medium after the recording magnetic pole passes the portion of the magnetic recording medium.

11. A magnetic recording head comprising:
    a main magnetic pole;
    an auxiliary magnetic pole juxtaposed with the main magnetic pole;
    a laminated body provided between the main magnetic pole and the auxiliary magnetic pole, the laminated body including a first magnetic layer, a second magnetic layer, and an intermediate layer provided between the first magnetic layer and the second magnetic layer, the first magnetic layer and the second magnetic layer being laminated in a direction generally perpendicular to a direction from the main magnetic pole to the auxiliary magnetic pole; and
    a pair of electrodes operable to pass a current through the laminated body.

12. The head according to claim 11, further comprising:
    one of a ferromagnetic layer and an antiferromagnetic layer adjacent to at least one of the first magnetic layer and the second magnetic layer and having higher coercivity than the one of the first and the second magnetic layers.

13. The head according to claim 11, wherein the second magnetic layer has higher coercivity than the first magnetic layer.

14. The head according to claim 11, wherein the second magnetic layer has a magnetization easy axis directed generally perpendicular to the lamination direction of the laminated body.

15. The head according to claim 11, wherein the second magnetic layer has a magnetization easy axis directed generally parallel to the lamination direction of the laminated body.

16. The head according to claim 15, wherein the main magnetic pole generates a magnetic field higher than the coercivity of the first magnetic layer and the second magnetic layer.

17. A magnetic recording apparatus comprising:
a magnetic recording medium; and
a magnetic recording head including:
- a recording magnetic pole;
- an auxiliary magnetic pole juxtaposed with the recording magnetic pole; and
- a spin oscillation device provided between the recording magnetic pole and the auxiliary magnetic pole, the spin oscillation device including a first magnetic layer having at least one magnetic material layer, a second magnetic layer having at least one magnetic material layer, and a first nonmagnetic layer provided between the first magnetic layer and the second magnetic layer,
- the first magnetic layer and the second magnetic layer being antiferromagnetically coupled and/or magnetostatically coupled to each other, and
- the first magnetic layer and the second magnetic layer being laminated in a direction generally perpendicular to a direction from the recording magnetic pole to the auxiliary magnetic pole,
the oscillation frequency of the spin oscillation device being generally equal to a ferromagnetic resonance frequency of a recording magnetic grain or a recording magnetic dot constituting a recording magnetic layer of the magnetic recording medium.

18. The apparatus according to claim 17, wherein the magnetic recording medium is a discrete track medium with adjacent recording tracks separated by a nonmagnetic member.

19. The apparatus according to claim 17, wherein the magnetic recording medium is a discrete bit medium in which recording magnetic dots isolated by a nonmagnetic member are regularly arranged.

20. The apparatus according to claim 17, wherein the auxiliary magnetic pole passes above a portion of a magnetic recording medium after the recording magnetic pole passes the portion of the magnetic recording medium.

21. A magnetic recording apparatus comprising:
a magnetic recording medium; and
a magnetic recording head including:
- a main magnetic pole;
- an auxiliary magnetic pole provided in juxtaposition with the main magnetic pole;
- a laminated body provided between the main magnetic pole and the auxiliary magnetic pole, the laminated body including a first magnetic layer, a second magnetic layer, and an intermediate layer provided between the first magnetic layer and the second magnetic layer, the first magnetic layer and the second magnetic layer being laminated in a direction generally perpendicular to a direction from the recording magnetic pole to the auxiliary magnetic pole; and
- a pair of electrodes operable to pass a current through the laminated body.

22. The apparatus according to claim 21, wherein a length of the first magnetic layer in a medium travel direction is greater than a value of a maximum travel velocity of the magnetic recording medium multiplied by $0.7 \times 10^{-9}$ seconds.

23. The apparatus according to claim 21, wherein a width of the main magnetic pole measured perpendicular to a medium travel direction is larger than a thickness of the first magnetic layer.

24. The apparatus according to claim 21, wherein the magnetic recording medium is a discrete track medium with adjacent recording tracks separated by a nonmagnetic member.

25. The apparatus according to claim 21, wherein the magnetic recording medium is a discrete bit medium in which recording magnetic dots isolated by a nonmagnetic member are regularly arranged.

26. The apparatus according to claim 21, wherein the auxiliary magnetic pole passes above a portion of a magnetic recording medium after the recording magnetic pole passes the portion of the magnetic recording medium.

* * * * *